United States Patent Office
3,809,689
Patented May 7, 1974

3,809,689
SYNTHETIC POLYOXIN TYPE NUCLEOSIDES AND
METHODS OF PREPARING
Nandyelath Damodaran, Poona, India, and John Moffatt,
Los Altos, and Gordon Jones and George Howarth,
Palo Alto, Calif., assignors to Syntex (U.S.A.) Inc.
No Drawing. Filed Feb. 25, 1971, Ser. No. 119,019
Int. Cl. C07d 51/52, 51/54
U.S. Cl. 260—211.5 R
30 Claims

ABSTRACT OF THE DISCLOSURE

Novel polyoxin type nucleosides and methods of preparing such compounds and also a generic process for converting nucleoside-5'-aldehydes or 5'-aldehyde hydrates to the corresponding hexofuranosyluronamide nucleosides. The novel polyoxin type nucleosides can be generally represented by the following formula

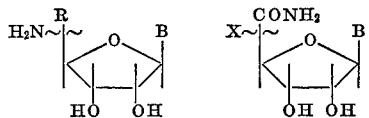

wherein

R is the group —CH$_2$OH, or —COOH; B is selected from pyrimidine or purine bases; X is the group —NH$_2$ or —OH and the wavy line indicates both the 5'-allo and -talo epimers.

The generic process is characterized by the step of treating a nucleoside-5'-aldehyde or 5'-aldehyde hydrate with an alkali metal cyanide salt and hydrogen peroxide. The compounds exhibit antibiotic activity, antifungal activity and general antimetabolite activity and are useful as antifungal agents such as, for example, agricultural fungicides, and also as sterilization agents.

BACKGROUND OF THE INVENTION

(1) The invention

This invention relates to polyoxin, and polyoxin type nucleosides and to methods of preparing such compounds. In a further aspect this invention relates to 5'-amino-5'-deoxyhexofuranosyluronic acid nucleoside isomers and epimeric mixtures and 5'-amino-5' - deoxyhexofuranosylnucleoside isomers and epimeric mixtures, and to methods of preparing such nucleosides. In another aspect this invention relates to hexofuranosyluronamide nucleoside isomers and epimeric mixtures and 5'-amino-5'-deoxyhexofuranosyluronamide nucleoside isomers and epimeric mixtures, and to methods of preparing such nucleosides. This invention also relates to a generical process for converting nucleoside-5'-aldehydes or aldehyde hydrates to the corresponding hexofuranosyluronamide nucleoside epimeric mixtures.

(2) The prior art

Within the last few years certain members of the polyoxin group of nucleoside derivatives have been found to possess exceptional antibiotic activity, especially as regards certain phytopathogenic fungi. Accordingly, considerable interest has centered on these compounds as agricultural fungicides. These polyoxins have typically been prepared by microbiological processes and a description of such processes and the polyoxins of the prior art can be found in British Pat. No. 1,196,853 and Isono et al., J. Am. Chem. Soc., v. 91, p. 7490 (1969).

We have now discovered new polyoxin type compounds having antibiotic activity and antimetabolite activity. We have further discovered chemical processes for preparing these new compounds.

SUMMARY

In summary the compounds of our invention can be represented by the following generic formulas:

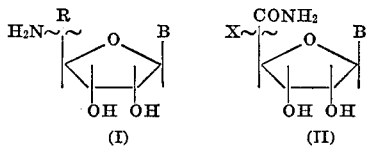

wherein R is the group —CH$_2$OH or —COOH, X is the group —OH, or —NH$_2$, and the wavy line at the 5'-position (∼) indicates both the 5'-allo and talo epimers; B is a pyrimidine base radical selected from the group having the formulas:

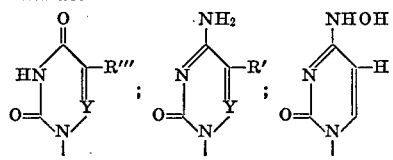

wherein

R' or R''' is H, fluoro, chloro, bromo, iodo, lower alkyl, trifluoromethyl, hydroxymethyl, nitro, methylamino, or dimethylamino, and Y is a carbon atom or a nitrogen atom, and where Y is nitrogen then R' or R''' is H or methyl; and wherein when R is —COOH and Y is carbon then R''' cannot be H, methyl or hydroxymethyl, in the β-D-allo series;

and a purine base radical selected from the group of adenin-9-yl, 2-fluoroadenin-9-yl, 2-azaadenin-9-yl, 6-methylaminopurin-9-yl, 6-dimethylaminopurin-9-yl, 7-deazaadenin-9-yl, 8-azaadenin-9-yl, 8-aza-9-deazaadenin-9-yl, guanin-9-yl, 8-azaguanin-9-yl, 7-deazaguanin-9-yl, or hypoxanthin-9-yl.

Also included in our invention are pharmaceutically acceptable salts of the above compounds.

The general process of our invention of converting nucleoside-5'-aldehydes or the corresponding aldehyde hydrates to the corresponding hexofuranosyluronamide nucleoside epimeric mixture in summary comprises the step of treating the 5'-aldehyde or 5'-aldehyde hydrate with an alkali metal cyanide salt in the presence of a suitable basic salt under mild reaction conditions, and then adding, preferably after a portion of the reaction has occurred, hydrogen peroxide or an equivalent oxidizing agent.

The compounds and processes of our invention will be further described hereinbelow.

FURTHER DESCRIPTION OF THE INVENTION AND PREFERRED EMBODIMENTS

The compounds of our invention of generic Formula I can be represented by the following sub-generic formulas:

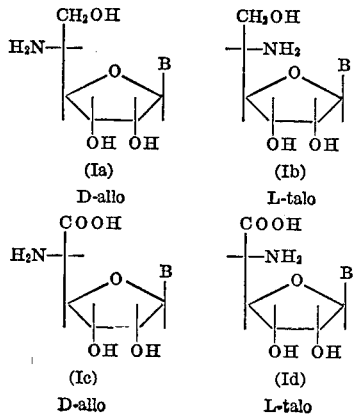

wherein B is a pyrimidine base radical selected from the group of radicals having the formulas:

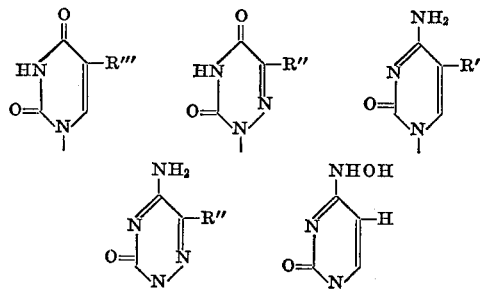

wherein

R' or R''' is H, fluoro, chloro, bromo, iodo, lower alkyl, trifluoromethyl, hydroxymethyl, nitro, methylamino, and dimethylamino, R'' is H or methyl, and wherein in the compound of Formula Ic, R''' is selected from the group of fluoro, chloro, bromo, iodo, lower alkyl having from 2 through 7 carbon atoms, trifluoromethyl, nitro, methylamino, and dimethylamino or a purine base radical selected from the group of adenin-9-yl, 2-fluoroadenin-9-yl, 2-aza-adenin-9-yl, 6-methylaminopurine-9-yl, 6-dimethylaminopurin-9-yl, 7-deazaadenin-9-yl, 8-azaadenin-9-yl, 8-aza-9-deazaadenin-9-yl, guanin-9-yl, 8-azaguanin-9-yl, 7-deazaguanin-9-yl, and hypoxanthin-9-yl.

Also encompassed within the compounds of Formula I, of our invention, are pharmaceutically acceptable salts of the above compounds of Formulas Ia, Ib, Ic and Id.

Typical compounds of Formulas Ia and Ib are, for example disclosed herein in Example 16.

The preferred compounds of Formula Ia are:

1-(5-amino-5-deoxy-β-D-allofuranosyl) uracil;
1-(5-amino-5-deoxy-β-D-allofuranosyl)-5-methyluracil;
1-(5-amino-5-deoxy-β-D-allofuranosyl)-5-hydroxymethyluracil;
1-(5-amino-5-deoxy-β-D-allofuranosyl)-5-fluorouracil;
1-(5-amino-5-deoxy-β-D-allofuranosyl) cytosine;
1-(5-amino-5-deoxy-β-D-allofuranosyl)-5-methylcytosine;
1-(5-amino-5-deoxy-β-D-allofuranosyl)-5-hydroxymethylcytosine;
1-(5-amino-5-deoxy-β-D-allofuranosyl)-5-fluorocytosine;
9-(5-amino-5-deoxy-β-D-allofuranosyl) adenine;
9-(5-amino-5-deoxy-β-D-allofuranosyl) guanine; and
9-(5-amino-5-deoxy-β-D-allofuranosyl)-2-azaadenine.

The preferred compounds of Formula Ib are the corresponding α-L-talofuranosyl isomers of the preferred β-D-allofuranosyl compounds of Formula Ia (for example 1-(5-amino-5-deoxy-α-L-talofuranosyl) uracil).

Typical compounds of Formulas Ic and Id are for example disclosed herein below in Examples 17, 25 and 25a.

The preferred compounds of Formula Ic:

1-(5-amino-5-deoxy-β-D-allofuranosyluronic acid)-5-fluorouracil;
1-(5-amino-5-deoxy-β-D-allofuranosyluronic acid) cytosine;
1-(5-amino-5-deoxy-β-D-allofuranosyluronic acid)-5-methylcytosine;
1-(5-amino-5-deoxy-β-D-allofuranosyluronic acid)-5-hydroxymethylcytosine;
1-(5-amino-5-deoxy-β-D-allofuranosyluronic acid)-5-fluorocytosine;
9-(5-amino-5-deoxy-β-D-allofuranosyluronic acid) adenine;
9-(5-amino-5-deoxy-β-D-allofuranosyluronic acid) guanine; and
9-(5-amino-5-deoxy-β-D-allofuranosyluronic acid)-2-azaadenine.

The preferred compounds of Formula Id include the corresponding α-L-talofuranosyluronic acid isomers of the preferred compounds of Formula Ic and also:

1-(5-amino-5-deoxy-α-L-talofuranosyluronic acid) uracil;
1-(5-amino-5-deoxy-α-L-talofuranosyluronic acid)-5-methyluracil; and
1-(5-amino-5-deoxy-α-L-talofuranosyluronic acid)-5-hydroxymethyluracil.

The compounds of Formula II, of our invention, can be represented by the following sub-generic formulas:

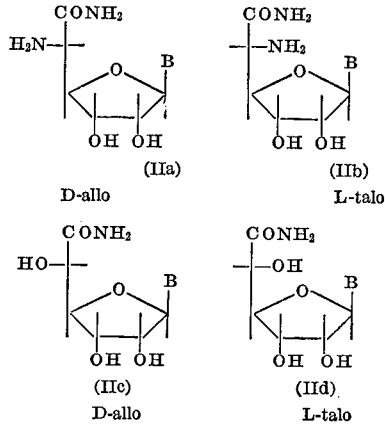

wherein B has the same meaning as set forth herein above.

Also encompassed within the compounds of Formula II, of our invention, are pharmaceutically acceptable salts of the above compounds of Formulas IIa and IIb.

Typical compounds of Formulas IIa and IIb can, for example, be found in Example 23.

The preferred compounds of Formula IIa are:

1-(5-amino-5-deoxy-β-D-allofuranosyluronamide) uracil;
1-(5-amino-5-deoxy-β-D-allofuranosyluronamide)-5-methyluracil;
1-(5-amino-5-deoxy-β-D-allofuranosyluronamide)-5-hydroxymethyluracil;
1-(5-amino-5-deoxy-β-D-allofuranosyluronamide)-5-fluorouracil;
1-(5-amino-5-deoxy-β-D-allofuranosyluronamide) cytosine;
1-(5-amino-5-deoxy-β-D-allofuranosyluronamide)-5-methylcytosine;
1-(5-amino-5-deoxy-β-D-allofuranosyluronamide)-5-hydroxymethylcytosine;
1-(5-amino-5-deoxy-β-D-allofuranosyluronamide)-5-fluorocytosine;
9-(5-amino-5-deoxy-β-D-allofuranosyluronamide) adenine;
9-(5-amino-5-deoxy-β-D-allofuranosyluronamide) guanine; and
9-(5-amino-5-deoxy-β-D-allofuranosyluronamide)-2-azaadenine.

The preferred compounds of Formula IIb are the corresponding α-L-talofuranosyluronamide isomers of the preferred β-D-allofuranosyluronamide compounds of Formula IIa (for example 1-(5-amino-5-deoxy-α-L-talofuranosyluronamide compounds of Formula IIa (for example 1-(5-amino-5-deoxy-α-L-talofuranosyluronamide) uracil).

Typical compounds of Formulas IIc and IId can, for example, be found in Examples 19 and 20.

The preferred compounds of Formula IIc are:

1-(β-D-allofuranosyluronamide) uracil;
1-(β-D-allofuranosyluronamide)-5-methyluracil;
1-(β-D-allofuranosyluronamide)-5-hydroxymethyluracil;
1-(β-D-allofuranosyluronamide)-5-fluorouracil;
1-(β-D-allofuranosyluronamide)-cytosine;

1-($\beta$-D-allofuranosyluronamide)-5-methylcytosine;
1-($\beta$-D-allofuranosyluronamide)-5-hydroxymethyl-cytosine;
1-($\beta$-D-allofuranosyluronamide)-5-fluorocytosine;
9-($\beta$-D-allofuranosyluronamide)-adenine;
9-($\beta$-D-allofuranosyluronamide)-guanine; and
9-($\beta$-D-allofuranosyluronamide)-2-azaadenine.

The preferred compounds of Formula IId are the corresponding $\alpha$-L-talofuranosyl isomers of the preferred $\beta$-D-allofuranosyl compounds of Formula IIc (for example 1-($\alpha$-L-talofuranosyluronamide) uracil).

The process of our invention of preparing the compounds of Formulas Ia and Ib of our invention can be conveniently represented by the following schematic overall reaction equation:

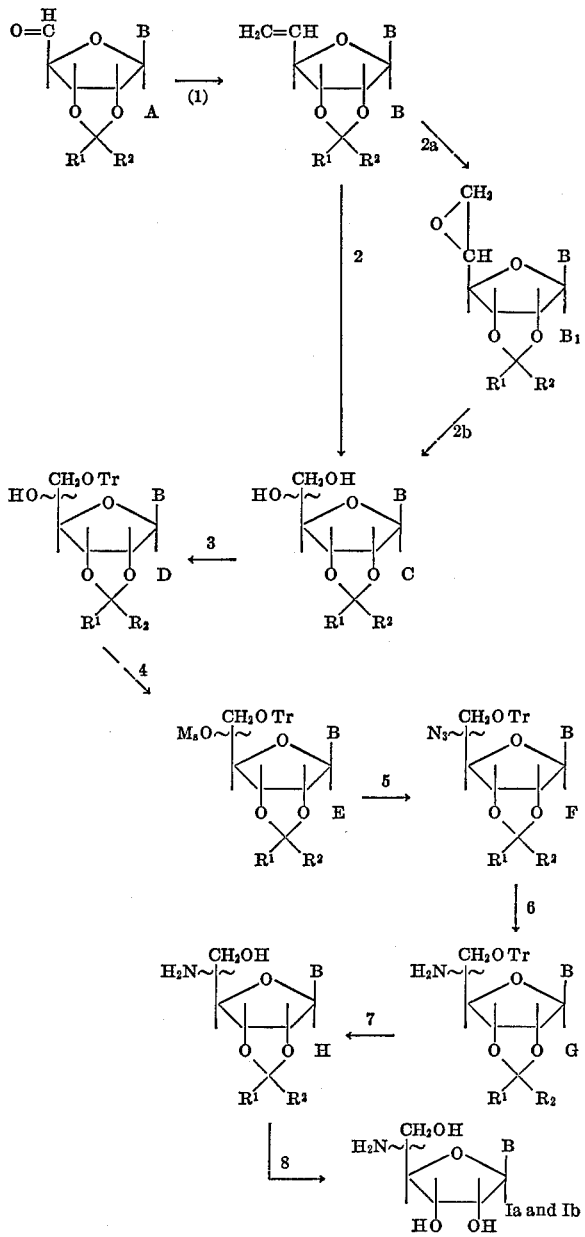

wherein $R^1$ and $R^2$ are lower alkyl or together with the carbon atom to which they are joined form a saturated cycloalkyl having from 5 through 7 ring atoms; Tr is a trityl radical; Ms is a mesyl radical and B is as defined above.

Considering the above process in greater detail, the first step of our process, i.e., the conversion of the nucleoside 5'-aldehydes to the corresponding 5'-eno nucleoside derivatives can be conveniently effected by treating the suitably protected nucleoside-5'-aldehyde with methylene triphenylphosphorane in an inert organic reaction media. This treatment is typically conducted at temperatures in the range of about from $-10°$ to $60°$ and preferably about $5°$ to $20°$ for from 5 minutes to 16 hours and preferably from about 15 minutes to one hour using mole ratios in the range of about from 2 to 5 moles of methylene triarylphosphorane per mole of nucleoside - 5' - aldehyde. However, temperatures, reaction times, and mole ratios both above and below these can also be used. Preferably the treatment is conducted under a nitrogen atmosphere. Suitable inert organic reaction media which can be used include for example, anhydrous tetrahydrofuran, diethyl ether, benzene, and the like. Methylene triarylphosphorane compounds which can be used include, for example, methylene triphenylphosphorane, methylene tri-p-tolylphosphorane, and the like. The methylene triarylphosphorane compounds are known compounds and can be prepared according to known procedures such as, for example, by the addition of methyltriarylphosphonium bromide to a suspension of sodium amide in liquid ammonia. The nucleoside-5'-aldehyde compounds of Formula A can be prepared, for example, by the oxidation of the corresponding suitably protected nucleoside according to the procedure described in U.S. Pat. No. 3,248,380.

The second step of our process (i.e., step 2) can be conveniently effected by treating the intermediate product of Formula B with a suitable oxidizing agent in the presence of a suitable inert organic solvent. Typically, the treatment is conducted at temperatures in the range of about from $-10°$ to $40°$ and preferably about from $0°$ to $5°$ for about from $\frac{1}{2}$ to 4 hours and preferably about from $\frac{1}{2}$ to one hour, using 1–2 molar equivalents of oxidizing agent per mole of nucleoside. Suitable oxidizing agents which can be used include, for example, potassium permanganate, osmium tetroxide, osmium tetroxide/potassium chlorate mixture, and the like. Suitable organic solvents which can be used include, for example, methanol, ethanol, isopropanol, acetone, and the like. The resulting product is an epimeric mixture of $\beta$-D-allo and $\alpha$-L-talofuranosyl nucleoside derivatives, of Formula C. The epimeric mixture can be used as the starting material for the next step of our invention or alternatively the mixture can be resolved into respective $\beta$-D-allo- and $\alpha$-L-talofuranosylisomers and the respective isomers then individually treated according to the remaining process. In effecting this process, we have found it convenient to use the epimeric mixture as the starting material for the remaining sequences of our process and then to effect the ultimate resolution of the respective isomers, if desired, as a later step. Thus, the remaining steps of this process will be described with respect to the epimeric mixture though it should be remembered that the process is equally applicable to the respective isomers individually.

Alternatively the intermediate product of Formula C can be prepared from the intermediate of Formula B via the production of the 5',6'-epoxy intermediate of Formula $B_1$. This intermediate can be conveniently prepared by treating the intermediate of Formula B with a peracid in a suitable organic solvent. Preferably the reaction is carried out using 1–3 equivalents of m-chloroperbenzoic acid in methylene chloride solution at $20°$ C. for 3–4 days. The intermediate of Formula $B_1$ can then be conveniently converted into the intermediate of Formula C by heating in a dipolar aprotic solvent, preferably dimethylformamide with 1–5 equivalents of an alkali metal salt, preferably sodium benzoate, for 2–16 hours, preferably 2–4 hours at $80–160°$, preferably $90–100°$, followed by treatment with a suitable base, preferably a catalytic quantity of sodium methoxide in methanol. This alternative procedure is particularly appropriate in the production of the intermediates of Formula C wherein the base moiety is uracil or a substituted uracil, typically resulting in higher yields.

The third step of our process, i.e., step 3, can be conveniently effected by treating the epimeric mixture of Formula C with a suitable halotriphenylmethane or substituted derivative thereof in the presence of a suitable organic reaction medium. The treatment is typically conducted at temperatures in the range of about from −10° to 100° and preferably about from 0° to 20° for about from 1 to 30 hours and preferably from about 16 to 24 hours using mole ratios in the range of about from 1 to 1.1 moles of halotriphenyl methane per mole of nucleoside. Suitable halotriphenyl methane compounds, which can be used include, for example, chlorotriphenylmethane, anisylchlorodiphenylmethane, dianisylchlorophenylmethane, bromotriphenylmethane and the like. Suitable organic reaction media, which can be used include, for example, pyridine, dimethylformamide in the presence of a base such as triethylamine, and the like. Best results are obtained using pyridine. The resulting product is an epimeric mixture of 6'-O-trityl protected nucleosides of Formula D.

The fourth step of the above process can be conveniently effected by treating the epimeric mixture of Formula D with a suitable lower alkylsulfonyl chloride or arylsulfonyl chloride in a suitable inert organic reaction media. This treatment is typically conducted at temperatures in the range of about from −10° to 25° and preferably from 0 to 10°, for about from 1 to 16 hours and preferably for about from 8 to 12 hours using mole ratios in the range of about from 1 to 2 moles of lower alkylsulfonyl chloride or arylsulfonyl chloride per mole of nucleoside. However, temperatures, reaction times, and mole ratios both above and below these ranges can also be used. Suitable organic reaction media which can be used include, for example, pyridine or an inert solvent such as ethyl acetate, dimethylformamide, etc., in the presence of pyridine and the like. Suitable lower alkylsulfonyl halide which can be used include, for example, methanesulfonyl chloride, ethanesulfonyl cholride and the like. Suitable arylsulfonyl chlorides which can be used include, for example, benzenesulfonyl chloride, p-toluenesulfonyl chloride, p-bromobenzenesulfonyl chloride and the like. The resulting product is an epimeric mixture of Formula E.

The fifth step of the above process can be conveniently effected by treating the epimeric mixture of Formula E with a suitable azide salt in a suitable liquid organic reaction medium. Typically, this treatment is conducted at temperatures in the range of about from 50° to 150° C. and preferably about from 70° to 90° C., for about from 1 to 24 hours and preferably for about from 4 to 6 hours, using mole ratios in the range of about from 3 to 5 of the azide per mole of nucleoside. However, temperatures, reaction times, and mole ratios both above and below these can also be used. Suitable azide salts which can be used include, for example, alkali metal salts such as sodium azide or lithium azide and organic salts such as tetraethylammonium azide, tetramethylguanidinium azide and the like. Suitable liquid inert organic reaction media which can be used include, for example, dimethylformamide, hexamethylphosphoramide, acetone, acetonitrile and the like. The resulting product is an epimeric mixture of Formula F.

The sixth step of our process can be conveniently effected by hydrogenation of the epimer mixture of Formula F or of either pure isomer. This can be conveniently effected, for example, by bubbling gaseous hydrogen through a solution of the epimeric mixture of Formula F in a suitable inert organic reaction media, in the presence of a suitable hydrogenation catalyst. Typically the treatment is conducted at temperatures in the range of about from 20 to 30° for a sufficient time to effect the desired degree of hydrogenation. Suitable catalysts which can be used, include, for example, palladium or palladium impregnated, nickel, or nickel impregnated catalysts and the like. Suitable organic reaction media which can be used include, for example, methanol, ethanol, isopropanol, ethylacetate, chloroform, and the like. The resulting epimeric mixture product of Formula G can then be recovered by any suitable procedure.

The seventh step of our process can be conveniently effected by any hydrolysis procedure which will selectively remove the 6'-O-trityl group without deleteriously effecting the nucleoside moiety or substituents thereon. This hydrolysis can be conveniently effected by treating the epimeric mixture of Formula G with 80% acetic acid, at temperatures of about from 50° to 100° for about from 10 to 300 minutes. The treatment should be monitored to ensure that no other side reactions such as hydrolysis of the 2',3'-acetal (if undesired) occurs. The resulting product can then be separated by any suitable procedure, for example, extraction, crystallization, thin-layer or column chromatography.

The eighth step of our invention can be effected by any suitable hydrolysis procedure which will selectively remove the 2',3'-protecting groups without deleteriously effecting the remainder of the nucleoside. But more conveniently is effected by conducting the hydrolysis steps of seven and eight as a single step by carefully controlling conditions and monitoring the reaction. The resulting epimeric mixture of Formulas Ia and Ib of our invention can be isolated by any suitable procedure such as, again, by evaporation, crystallization, thin-layer or column chromatography. After isolation and purification, the respective β-D-allofuranosyl (Formula Ia) and α-L-talofuranosyl (Formula Ib) isomers can be resolved by thin-layer or ion exchange chromatography and/or fractional crystallization.

The 5'-amino-5'-deoxy-β-D-hexofuranosyluronic acid nucleosides of Formulas Ic and Id of our invention can be prepared from Compound H by selective acylation of the 5'-amino function with chloroacetic anhydride in methanol, followed by oxidation of the 6'-hydroxyl group to a carboxyl function using chromic oxide in moist pyridine-acetic acid (see e.g., Watanabe, Kotick and Fox, J. Org. Chem., 35, 231 (1970)). The chloroacetyl group can then be removed by treatment with thiourea in hot ethanol according to the general procedure of Masaki et al. (JACS, 90,4508 (1968)). Finally, removal of the 2',3'-acetal function by treatment with 80% acetic acid as described above gives the amino acids Ia and Ib.

This treatment can be conveniently represented by the following schematic overall reaction equation:

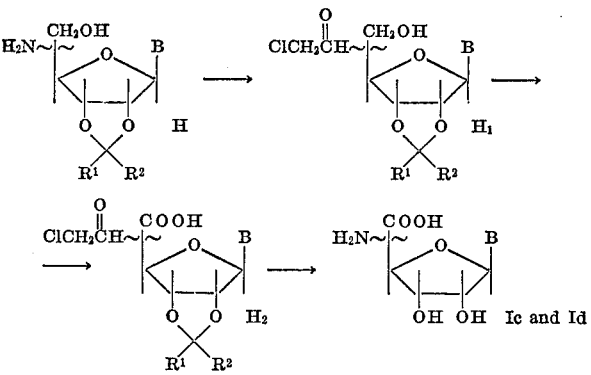

Since nitro, iodo, and bromo groups are at least partially reduced or hydrogenolysed during reduction of azido functions (e.g., Formula F), care must be taken to ensure that the catalytic hydrogenation is terminated as soon as the azido group has been converted to the amine. As an alternative to this procedure, the azido function in the compound of F, where the base is substituted by nitro, iodo or bromo groups, can optionally be reduced by treatment with an excess of sodium borohydride in an alcohol such as ethanol or isopropanol according to the general procedure of Smith, Hall and Kan (JACS, 84, 485 (1962)) or of Goodman and Christensen (J. Org. Chem., 28, 158 (1963)) or of Ali and Richardson (Carb. Res., 5, 441 (1967)).

The $N^4$-hydroxycytosine derivatives of Formulas Ia–Id are conveniently prepared by reaction of the corresponding cytosine compounds with an excess (2–3 equivalents) of aqueous hydroxylamine hydrochloride at room temperature for several days.

The intermediates of Formula D can also be converted according to an embodiment of our invention to the corresponding 5'-oxime derivatives. This embodiment can be represented by the following schematic overall reaction equations:

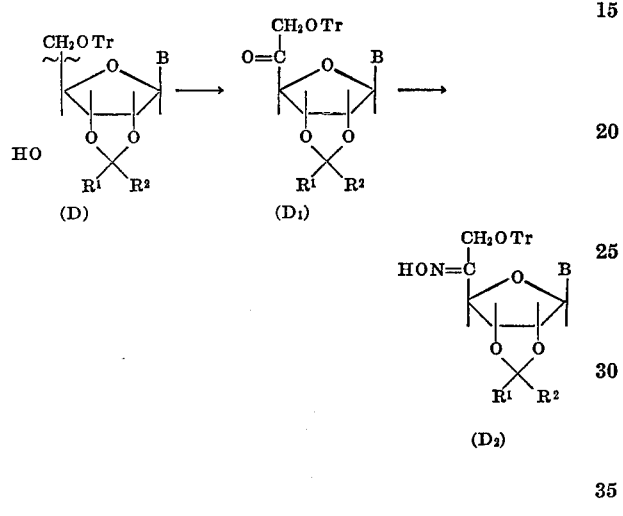

wherein Tr is trityl and B is as defined hereinabove.

The first step of the above process can be conveniently effected by treating the epimer mixture of Formula D with a mixture of a lower alkylsulfoxide and acetic anhydride. This treatment is typically conducted at temperatures in the range of about from 24 to 36 hours using mole ratios in the range of about from 10 to 40 moles of lower alkylsulfoxide and about from 5 to 20 moles of acetic anhydride per mole of nucleoside. The resulting product of Formula $D_1$ can then be separated by, for example, crystallization or chromatography on silicic acid. Suitable alkylsulfoxide compounds which can be used include, for example, dimethylsulfoxide, diethylsulfoxide, tetramethylenesulfoxide and the like. Alternatively, in place of acetic anhydride, the following compounds can be used, benzoic anhydride, and phosphorus pentoxide.

The second step of the above process can be conveniently effected by treating the compound of Formula $D_1$ with a mixture of hydroxylamine hydrochloride, pyridine, ethanol, and water. Typically, this treatment is conducted at temperatures in the range of about 20–90° C. from 1 to 12 hours using mole ratios in the range of about from 1 to 5 of hydroxylamine hydrochloride; about from 1 to 5 moles of pyridine per mole of nucleoside in aqueous ethanolic solution. Alternatively, in place of hydroxylamine hydrochloride, hydroxylamine sulfate and the like could also be used. In place of pyridine, the following compounds, triethylamine, α-picoline and the like can be used. Similarily, in place of ethanol, isopropanol and the like could be used. The resulting epimeric mixture of 5'-amino nucleoside derivative of Formula G can then be prepared by any suitable reduction procedure such as, for example, by catalytic reduction over Raney nickel, which in turn can be converted to the compounds of Formulas Ia and Ib according to the procedures described hereinabove.

The process according to our invention for preparing the compounds of Formulas Ic, Id and II can be conveniently represented by the following schematic overall reaction equations:

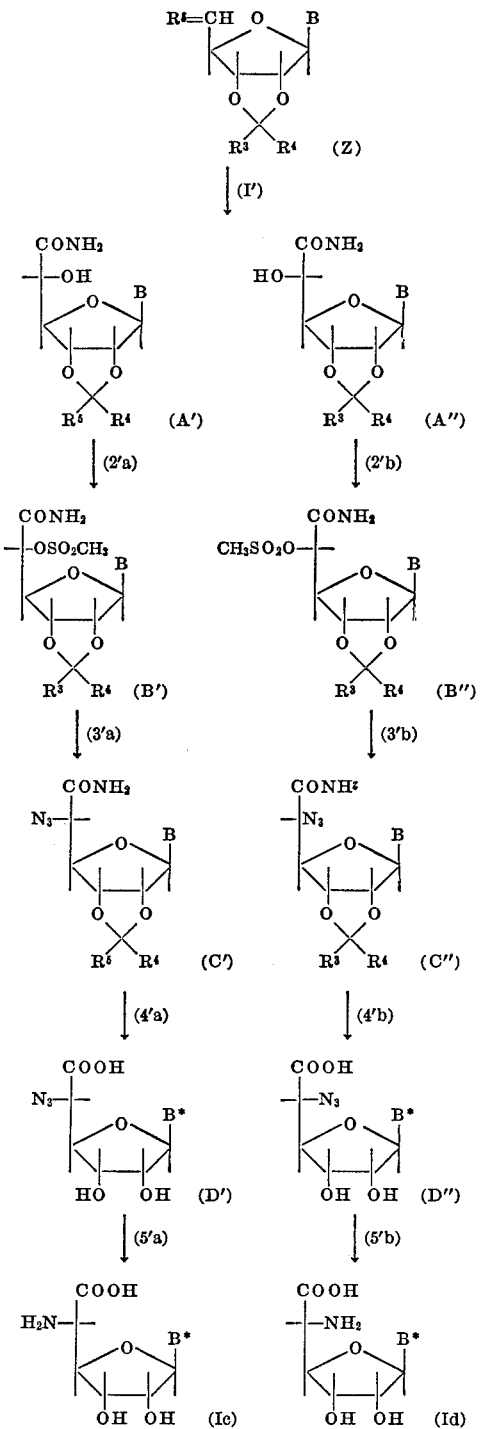

wherein $R^5$ is oxo or $=(OH)_2$; $R^3$ and $R^4$ are independently lower alkyl or aryl having 6 through 10 carbon atoms, or $R^3$ and $R^4$ together with the carbon atom to which they are joined form a saturated cycloalkyl having 5 through 7 ring atoms and B is a pyrimidine base radical selected from the group having the formulas:

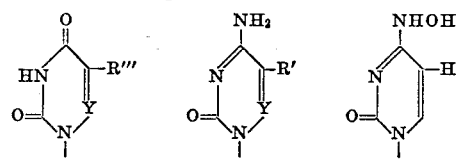

wherein R' or R''' is H, fluoro, chloro, bromo, iodo, lower alkyl, trifluoromethyl, hydroxymethyl, nitro, methylamino, and dimethylamino, and Y is a carbon atom or a nitrogen atom, and where Y is nitrogen then R' or R''' is H or methyl.

Considering the above process in greater detail, the first step of the process, the preparation of the α-L-talofuranosyluronamide and β-D-allofuranosyluronamide intermediates of Formulas A' and A'', respectively, can be conveniently effected by treating the corresponding nucleoside-5'-aldehydes or their hydrates of Formula Z with a suitable cyanide salt. This treatment is typically, and preferably, conducted in the presence of a suitable inert organic solvent such as methanol and preferably in the presence of a suitable base such as, for example, potassium carbonate. The treatment is typically conducted at temperatures in the range of about from −10° to 20° C. and preferably from 0 to 5° C., using mole ratios in the range of about from 0.2 to 0.5 mole of nucleoside starting material per mole of cyanide salt. However, temperature and mole ratios both above and below these ranges can also be used. Subsequent addition of an oxidizing agent such as, for example, hydrogen peroxide leads to the formation of A' and A''. Typically, the oxidizing agent is added in the neighborhood of about from 5 to 30 minutes after the initial reactants are mixed. The total reaction time is typically in the range of about from 45 to 60 minutes. After the desired reaction has taken place, the reaction solution is neutralized to a pH of about 7 by the addition of a suitable acid, for example, acetic acid, and the resulting product, which is an epimeric mixture of the respective intermediates of Formulas A' and A'' can be recovered by any suitable procedure such as, for example, fractional crystallization and chromatography on silicic acid. Suitable cyanide salts, which can be used include, for example, sodium cyanide, potassium cyanide, ammonium cyanide, tetraethylammonium cyanide and the like. Suitable inert organic solvent which can be used include, for example, methanol, ethanol, dioxane, tetrahydrofuran and the like. Suitable bases which can be used include, for example, potassium carbonate, sodium carbonate and the like. Suitable acids which can be used to neutralize the reaction mixture include, for example, acetic acid, Dowex 50 (H+) resin, Amberlite IRC–50 (H+) resin, phosphoric acid and the like. The nucleoside-5'-aldehyde, or 5'-aldehyde hydrate starting materials can be prepared by any suitable procedure such as, for example, by the oxidation of the 2',3'-protected nucleoside-5'-alcohol according to the procedure described in U.S. Pat. No. 3,248,380.

The resulting epimeric mixture can then be applied as to the subsequent process step of our invention, or preferably the epimer mixture can be resolved into its respective α-L-talo and β-D-allo isomers, which can then be individually subjected to the remaining steps of our process. We have found that by treating the respective isomers individually rather than as an epimeric mixture, cleaner products are ultimately obtained with less purification difficulties. Resolution of the respective L-talo and D-allo isomers can be effected by any suitable resolution procedure and, for example, can be effected by fractional crystallization.

The second step of our process (i.e., step 2a or 2b) can be conveniently effected by treating the corresponding intermediates of Formulas A' and/or A'' (either individually or an epimeric mixture) with a suitable alkylsulfonyl halide or arylsulfonyl halide in the presence of a suitable organic base, e.g., pyridine, thereby affording the corresponding 5'-alkylsulfonyl or 5'-arylsulfonyl pyrimidine derivatives of Formulas B' and/or B''. This treatment is typically conducted at temperatures in the range of about from −10 to 20° C. and preferably in the range of about from 0° to 5° C. for about from 5 to 24 hours, preferably from 10 to 16 hours using mole ratios in the range of about from 0.5 to 1.0 mole of nucleoside starting materials per mole of alkylsulfonyl halide or arylsulfonyl halide, and preferably in the range of about from 0.9 to 1.0. However, temperatures, times, and mole ratios both above and below these ranges can also be used. The resulting product of Formulas B' and/or B'' can be isolated by any suitable procedure, such as crystallization or chromatography on silicic acid. Suitable alkylsulfonyl halides which can be used include, for example, methanesulfonyl chloride, ethanesulfonyl chloride and suitable arylsulfonyl halides include benzenesulfonyl chloride, p-toluenesulfonyl chloride and p - bromobenzenesulfonyl chloride and the like. Suitable organic solvents which can be used include, for example, dimethylformamide/triethylamine, and the like.

The third step of our process (i.e., steps 3a and/or 3b) can be conveniently effected by treating the intermediates of Formulas B' and/or B'' (again either individually or as an epimeric mixture) with a suitable azide salt in a suitable inert organic media. This treatment effects an inversion of the 5'-substituent, thus the L-talo isomer of Formula B' affords the corresponding 5'-azido D-allo isomer of Formula C' and correspondingly the D-allo isomer of Formula B'' affords the corresponding 5'-azido-L-talo isomer of Formula C''. This treatment is typically conducted at temperatures in the range of about from 50 to 90° C., and preferably about from 60 to 70° C. for about from 3 to 6 hours, using mole ratios in the range of about from 0.2 to 0.5 mole of nucleoside per mole of azide salt. However, temperatures, reaction times and mole ratios both above and below these ranges can be used. Suitable azide salts, which can be used include, for example, sodium azide, lithium azide, potassium azide, tetraethylammonium azide and the like. Suitable inert organic solvents, which can be used include, for example, dimethylformamide, acetone, hexamethylphosphoramide, dimethylsulfoxide and the like. We have further found that best results are typically obtained by using sodium azide as the azide salt and dimethylformamide as the organic media. The resulting product of Formulas C' and/or C'' can be separated from the reaction mass and further purified according to any suitable procedure for example, crystallization and chromatography on silicic acid or alumina.

The fourth step of our process (i.e., steps 4a and/or 4b) is the removal of the 2',3'-protecting group and the conversion of the 6-amide group into the corresponding carboxylic acid group in the pyrimidine series can be accomplished by any suitable proceduue. For example, we have found that this step can be conveniently effected by the hydrolysis of the pyrimidine intermediates of Formulas C' and/or C'' (either individually or as an epimeric mixture) by heating with a suitable ion exchange resin in the hydrogen ion form. The resulting product of Formulas D' and/or D'' can be isolated and purified by any suitable procedure such as, for example, ion exchange chromatography and crystallization. Suitable ion exchange resins which can be used include, for example, those sold under the trademarks Dowex 50 (H+), Amberlite IR–120 (H+) and the like.

The compounds of Formulas D' and/or D'' can be conveniently converted into the compounds of Ic and/or Id, of our invention, by hydrogenation. This hydrogenation can be effected by any suitable procedure and for example can be conveniently effected by treating the compounds of Formulas D and/or D' with hydrogen gas in the presence of a suitable catalyst. Suitable catalysts include, for example, nickel or nickel impregnated, palladium or palladium impregnated catalysts. The resulting product can again be separated by any suitble procedures such as, for example, crystallization, chromatography on cellulose or ion exchange chromatography. Where an epimeric mixture has been used, the respective D-allo and L-talo isomers can be resolved by any suitable resolution procedure, such as by thin-layer chromatography.

The compounds of Formulas IIc and IId can be prepared according to our invention by the hydrolysis of the respective allo and talo epimer intermediates of Formulas A″ and A′, respectively. This can be represented by the following schematic overall reaction equation:

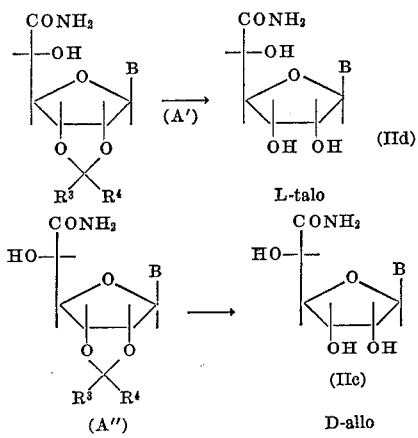

This treatment can, for example, be conveniently effected by treating the corresponding intermediates of Formulas A′ and/or A″, or an epimeric mixture thereof with 80% acetic acid at about 100° for about 3 hours followed by evaporation to dryness under reduced pressure. However, temperatures and reaction times both above and below this can also be used. The products IId and IIc are obtained by partitioning the residue between water and ether, followed by evaporation of the aqueous phase to dryness and crystallization of the residue from a suitable solvent such as ethanol, methanol or aqueous mixture thereof and the like.

The compounds of Formulas IIa and IIb can be prepared according to our invention via the treatment of the respective D-allo and L-talo derivatives of Formulas C′ and C″, respectively. This treatment can be represented by the following two step schematic overall reaction equations:

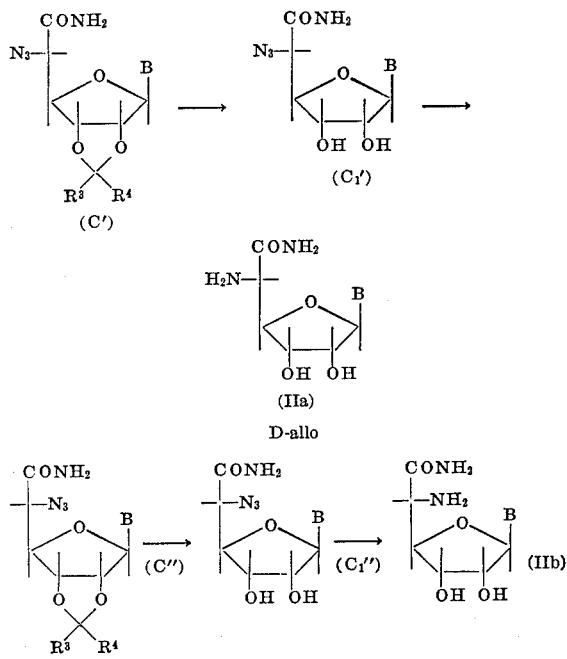

The first step of this treatment can, for example, be conveniently effected by treating the intermediates of Formulas C′ and/or C″, or an epimeric mixture thereof, with 80% acetic acid according to the same procedure as described herein above with respect to the conversion of intermediate A′ to the compounds of Formula IId. The resulting products of $C_1'$ and $C_1''$ are then conveniently converted to the corresponding compounds of Formulas IIa and IIb of our invention by hydrogenation over a suitable catalyst, for example, palladium or nickel, preferably a palladium impregnated, barium sulfate catalyst. Alternatively, the hydrogenation step can be conducted prior to the hydrolysis step.

Again, since nitro, iodo, and bromo groups are at least partially reduced or hydrogenolysed during reduction of azido functions (e.g., Formula F), care must be taken to ensure that the catalytic hydrogenation is terminated as soon as the azido group has been converted to the amine. As an alternative to this procedure, the azido function in the compound of F, where the base is substituted by nitro, iodo or bromo groups, can optionally be reduced by treatment with an excess of sodium borohydride in an alcohol such as ethanol or isopropanol according to the general procedure of Smith, Hall and Kan (JACS, 84, 485 (1962)) or of Goodman and Christensen (J. Org. Chem., 28, 158 (1963)) or of Ali and Richardson (Carb. Res., 5, 441 (1967)).

The $N^4$-hydroxycytosine derivatives of Formulas IIa–IId are conveniently prepared by reaction of the corresponding cytosine compounds with an excess of 2 to 3 equivalents of aqueous hydroxylamine hydrochloride at room temperature (about 20° C.) for several days.

In each of the process steps, described herein above and below, the respective intermediate products are preferably separated from the reaction mixture and purified prior to their use as starting materials for the next process, in the sequence. Such separation and purification can be effected by any suitable procedure, for example, typical separation procedures, include filtration, extraction, evaporation, and typical purification procedures include crystallization, and both thin-layer and column chromatography. Optimum separation and isolation procedures can be obtained for any given step, by routine experimentation.

The compounds of our invention possess antibiotic, and in particular antifungal activity, as well as general antimetabolite activity and thus are useful both as antifungal agents (e.g., agricultural fungicides) and also as sterilization agents where the conventional more economical sterilization procedures are either ineffective or deleterious to organisms desired to be retained. The compounds, of our invention, are useful in containing or destroying undesired organisms in mammals.

A further understanding of our invention can be had from the following non-limiting examples, wherein quantities are expressed as grams or gram moles, temperatures refer to degrees centigrade and room or ambient temperature refers to about 20° C., and wherein Examples 1 through 4a illustrate methods of preparing starting materials.

The term pharmaceutically acceptable salts as used herein above and below refers to those salts which do not adversely affect the pharmaceutical properties of compounds of Formula I such as, for example, are conventionally used in the pharmaceutical art. Typical pharmaceutically acceptable salts thus include, for example, salts of inorganic acids such as, for example, sulfuric, sulfonic, sulfamic, nitric, phosphoric, hydrochloric acids and the like, and salts of organic acids such as, for example, acetic, citric, lactic, palmitic, tartaric, succinic, maleic, benzoic acids and the like; and also cation salts, such as, for example, sodium, potassium, ammonium, and the like.

EXAMPLE 1

A solution of 122 g. (0.5 mole) of uridine, 129 g. (0.75 mole) of 1,1-diethoxycyclohexane and 2.5 ml. of 70% perchloric acid in 1 l. of dimethylformamide is heated in a round bottomed flask at 70° at 15 mm. pressure. The reaction vessel is fitted with a reflux condenser of such a length that dimethylformamide refluxes but that ethanol, the by-product of the reaction, is distilled off. After 2 hours, the reaction mixture is neutralized with triethylamine and evaporated to dryness in vacuo. The residue is partitioned between brine and chloroform, the chloroform layer is dried over magnesium sulfate, filtered and is concentrated to a syrup. Crystallization from chloroform-hexane gives 135 g. of 2′,3′-O-cyclohexylideneuridine.

By following the same procedures as above, but respectively using the corresponding nucleoside in place of uridine and adding 1 equivalent of p-toluenesulfonic acid in the cases where basic nucleosides are used, e.g. 5-methylaminouridine the following compounds are prepared:

2′,3′-O-cyclohexylidene-5-fluorouridine;
2′,3′-O-cyclohexylidene-5-chlorouridine;
2′,3′-O-cyclohexylidene-5-bromouridine;
2′,3′-O-cyclohexylidene-5-iodouridine;
2′,3′-O-cyclohexylidene-5-methyluridine;
2′,3′-O-cyclohexylidene-5-iso-propyluridine;
2′,3′-O-cyclohexylidene-5-n-butyluridine;
2′,3′-O-cyclohexylidene-5-trifluoromethyluridine;
2′,3′-O-cyclohexylidene-5-benzyloxymethyluridine;
2′,3′-O-cyclohexylidene-5-nitrouridine;
2′,3′-O-cyclohexylidene-5-methylaminouridine;
2′,3′-O-cyclohexylidene-5-dimethylaminouridine;
2′,3′-O-cyclohexylidene-6-azauridine;
2′,3′-O-cyclohexylidene-6-aza-5-methyluridine;
2′,3′-O-cyclohexylideneinosine;
2′,3′-O-cyclohexylideneguanosine;
2′,3′-O-cyclohexylidene-8-azaguanosine;
2′,3′-O-cyclohexylidene-7-deazaguanosine; and
2′,3′-O-cyclohexylidene-$N^6$-dimethyladenosine.

EXAMPLE 2

A solution of 26.7 g. (0.1 mole) adenosine, 26 g. (0.15 mole) 1,1-diethoxycyclohexane, 1.72 g. (0.1 mole) p-toluenesulfonic acid and 0.5 ml. 70% perchloric acid in 200 ml. dimethylformamide is heated at 70° and 15 mm. pressure as described in Example 1. After 2 hours the reaction mixture is neutralized with triethylamine and evaporated to dryness in vacuo. The residue is partitioned between chloroform and water, the chloroform phase is dried over magnesium sulfate, filtered and is concentrated to a syrup. Crystallization from chloroform hexane gives 25.2 g. of 2′,3′-O-cyclohexylideneadenosine.

By following the same procedure as above but respectively using the corresponding nucleoside in place of adenosine the following compounds are prepared:

2′,3′-O-cyclohexylidenecytidine;
2′,3′-O-cyclohexylidene-5-fluorocytidine;
2′,3′-O-cyclohexylidene-5-chlorocytidine;
2′,3′-O-cyclohexylidene-5-bromocytidine;
2′,3′-O-cyclohexylidene-5-iodocytidine;
2′,3′-O-cyclohexylidene-5-methylcytidine;
2′,3′-O-cyclohexylidene-5-iso-propylcytidine;
2′,3′-O-cyclohexylidene-5-n-butylcytidine;
2′,3′-O-cyclohexylidene-5-trifluoromethylcytidine;
2′,3′-O-cyclohexylidene-5-benzyloxymethylcytidine;
2′,3′-O-cyclohexylidene-5-nitrocytidine;
2′,3′-O-cyclohexylidene-5-methylaminocytidine;
2′,3′-O-cyclohexylidene-5-dimethylaminocytidine;
2′,3′-O-cyclohexylidene-6-azacytidine;
2′,3′-O-cyclohexylidene-6-aza-5-methylcytidine;
2′,3′-O-cyclohexylidene-2-fluoroadenosine;
2′,3′-O-cyclohexylidene-2-azaadenosine;
2′,3′-O-cyclohexylidene-$N^6$-methyladenosine;
2′,3′-O-cyclohexylidene-7-deazaadenosine;
2′,3′-O-cyclohexylidene-8-azaadenosine; and
2′,3′-O-cyclohexylidene-8-aza-9-deazaadenosine.

EXAMPLE 3

A solution of 17.23 g. (0.05 mole) 2′,3′-O-cyclohexylideneadenosine and 30 ml. benzoylchloride in 200 ml. pyridine is kept at room temperature for 2 hours and then the reaction mixture is poured into excess ice-water giving a gummy precipitate. This is extracted into chloroform (2× 350 ml.), the chloroform extracts are washed with aqueous sodium bicarbonate, water, dried over magnesium sulfate, and evaporated to a red syrup. The syrup is dissolved in a mixture of 250 ml. pyridine and 250 ml. 2 N sodium hydroxide and the mixture is shaken at room temperature for 1 hour, neutralized with acetic acid and evaporated to dryness. The residue is partitioned between chloroform (500 ml.) and water (250 ml.), the chloroform layer is washed with aqueous sodium bicarbonate and water, dried over magnesium sulfate and evaporated to dryness. The residue is crystallized from ethanol giving 16.60 g. of $N^6$-benzoyl 2′,3′-O-cyclohexylideneadenosine.

By following the same procedures as above, but respectively using the products of Example 2 in place of 2′,3′-O-cyclohexylideneadenosine, the corresponding $N^4$-benzoylated cytidine derivatives and $N^6$-benzoylated adenosine derivatives are obtained.

EXAMPLE 4

This example illustrates methods of preparing nucleoside 5′-aldehyde and 5′-aldehyde hydrate starting materials. In this example 37.8 g. (0.3 mole) of diisopropylcarbodiimide and 4.0 ml. (0.05 mole) of dichloroacetic acid is added to a mixture of 32.4 g. (0.1 mole) of 2′,3′-O-cyclohexylideneuridine in 250 ml. of dimethylsulfoxide at room temperature. The resulting solution is allowed to stand at room temperature for 60 minutes and then 25.0 g. of oxalic acid dihydrate in 1 l. of methanol is added to destroy excess carbodiimide. After this addition, 23.0 g. of N,N′-diphenylethylenediamine is added and the resulting solution then stored at room temperature (about 20° C.) for about five hours. The resulting crystals are collected by filtration and are washed thoroughly with methanol affording 2′,3′-O-cyclohexylidene-5′-deoxy-5′,5′-(N,N′-diphenylethylenediamino)-uridine, which is then further purified by recrystallization using a chloroform-methanol solvent. The purified product is then treated in either of two ways as follows.

(a) 3.40 g. of one portion of the above purified product is dissolved in 350 ml. of methylene chloride and a solution containing 3.40 g. of p-toluenesulfonic acid monohydrate in 50 ml. of acetone is slowly added with constant stirring at room temperature. The resulting mixture is continually stirred at room temperature for 30 minutes and the resulting precipitate of N,N′-diphenylethylenediammonium p-toluenesulfonate is removed by filtration and washed with methylene chloride. The filtrate and methylene chloride washings are combined and evaporated to dryness. The resulting residue is dissolved in 1 l. of ethyl acetate and washed successively with 500 ml. of aqueous sodium bisulfate solution, then 500 ml. of aqueous sodium bicarbonate solution, and then water. The washed ethyl acetate solution is dried over magnesium sulfate and then concentrated by vacuum evaporation affording 2′,3′-O-cyclohexylideneuridine-5′-aldehyde, as a chromatographically homogeneous foam.

(b) 48.8 grams of a second portion of 2′,3′-O-cyclohexylidene - 5′ - deoxy - 5′,5′ - (N,N′-diphenylethylenediamino)-uridine is dissolved in a mixture of 500 ml. of tetrahydrofuran and 50 ml. of water. The resulting solution is heated to 60° C. and 150 g. of sulfonated polystyrene ion exchange resin (e.g. Dowex 50) in the H+ form is added and the resulting mixture then stirred at 60° C. for 45 minutes, followed by the addition of another 150 g. of the same resin. The mixture is heated at 60° C. for an additional 15 minutes, and then filtered to remove the ion exchange resin. The resulting filtrate is concentrated by vacuum evaporation and the residue is triturated with about 100 ml. of water affording crystalline 2′,3′-O-cyclohexylideneuridine - 5′ - aldehyde hydrate which is recovered by filtration. Additional hydrate product is recovered by evaporation of the filtrate.

By following the same procedures as above, but respectively using the corresponding nucleosides as starting materials, the following compounds, and also their corresponding 5'-aldehyde hydrate derivatives, are prepared:

2',3'-O-cyclohexylidene-5-fluorouridine-5'-aldehyde;
2',3'-O-cyclohexylidene-5-chlorouridine-5'-aldehyde;
2',3'-O-cyclohexylidene-5-bromouridine-5'-aldehyde;
2',3'-O-cyclohexylidene-5-iodouridine-5'-aldehyde;
2',3'-O-cyclohexylidene-5-methyluridine-5'-aldehyde;
2',3'-O-cyclohexylidene-5-isopropyluridine-5'-aldehyde;
2',3'-O-cyclohexylidene-5-n-butyluridine-5'-aldehyde;
2',3'-O-cyclohexylidene-5-trifluoromethyluridine-5'-aldehyde;
2',3'-O-cyclohexylidene-5-benzyloxymethyluridine-5'-aldehyde;
2',3'-O-cyclohexylidene-5-nitrouridine-5'-aldehyde;
2',3'-O-cyclohexylidene-6-azauridine-5'-aldehyde;
2',3'-O-cyclohexylidene-6-aza-5-methyluridine-5'-aldehyde;
2',3'-O-cyclohexylideneinosine-5'-aldehyde.

EXAMPLE 4a

A mixture of 4.51 g. (10 mmoles) of $N^6$-benzoyl 2',3'-O-cyclohexylideneadenosine, 6.2 g. dicyclohexylcarbodiimide, 0.8 ml. pyridine, 0.4 ml. trifluoroacetic acid and 25 ml. dimethylsulfoxide is kept at room temperature for 6 hours. A solution of 2.6 g. oxalic acid dihydrate in 10 ml. methanol is added and after 30 minutes the precipitated N,N'-dicyclohexylurea is removed by filtration and washed well with ethylacetate (200 ml.). The combined filtrate and washings are washed with aqueous sodium bicarbonate, twice with water, dried over magnesium sulfate and evaporated to dryness to give crude $N^6$-benzoyl-2',3'-O-cyclohexylideneadenosine-5'-aldehyde hydrate of sufficient purity for subsequent reactions.

By following the same procedure as above, but using the corresponding protected nucleosides in place of $N^6$-benzoyl-2',3'-O-cyclohexylideneadenosine, the following compounds are prepared either as the free aldehyde or its hydrate.

$N^6$-benzoyl-2',3'-O-isopropylideneadenosine-5'-aldehyde;
$N^6$-benzoyl-2',3'-O-cyclohexylidene-2-fluoroadenosine-5'-aldehyde;
$N^6$-benzoyl-2',3'-O-cyclohexylidene-2-azaadenosine-5'-aldehyde;
$N^6$-benzoyl-2',3'-O-cyclohexylidene-$N^6$-methyladenosine-5'-aldehyde;
$N^6$-benzoyl-2',3',O-cyclohexylidene-7-deazaadenosine-5'-aldehyde;
$N^6$-benzoyl-2',3'-O-cyclohexylidene-8-azaadenosine-5'-aldehyde;
$N^6$-benzoyl-2',3'-O-cyclohexylidene-8-aza-9-deaza-adenosine-5'-aldehyde;
2',3'-O-cyclohexylidene-$N^6$-dimethyladenosine-5'-aldehyde
$N^4$-benzoyl-2',3'-O-cyclohexylidenecytidine-5'-aldehyde;
$N^4$-benzoyl-2',3'-O-cyclohexylidene-5-fluorocytidine-5'-aldehyde;
$N^4$-benzoyl-2',3'-O-cyclohexylidene-5-chlorocytidine-5'-aldehyde;
$N^4$-benzoyl-2(,3(-O-cyclohexylidene-5-bromocytidine-5'-aldehyde;
$N^4$-benzoyl-2',3'-O-cyclohexylidene-5-iodocytidine-5'-aldehyde;
$N^4$-benzoyl-2',3'-O-cyclohexylidene-5-methylcytidine-5'-aldeheyde;
$N^4$-benzoyl-2',3'-O-cyclohexylidene-5-iso-propylcytidine-5'-aldehyde;
$N_4$-benzoyl-2',3'-O-cyclohexylidene-5-n-butylcytidine-5'-aldehyde;
$N^4$-benzoyl-2',3'-O-cyclohexylidene-5-trifluoromethyl-cytidine-5'-aldehyde;
$N^4$-benzoyl-2',3'-O-cyclohexylidene-5-benzoyloxymethyl-cytidine-5'-aldehyde;
$N^4$-benzoyl-2',3'-O-cyclohexylidene-5-nitrocytidine-5'-aldehyde;
$N^4$-benzoyl-2',3'-O-cyclohexylidene-5-methylaminocytidine-5'-aldehyde;
$N^4$-benzoyl-2',3'-O-cyclohexylidene-5-dimethylaminocytidine-5'-aldehyde;
$N^4$-benzoyl-2',3'-O-cyclohexylidene-6-azacytidine-5'-aldehyde;
$N^4$-benzoyl-2',3'-O-cyclohexylidene-6-aza-5-methylcytidine-5'-aldehyde;
2,3'-O-cyclohexylideneguanosine-5'-aldehyde;
2,3'-O-cyclohexylidene-8-azaguanosine-5'-aldehyde;
2,3'-O-cyclohexylidene-7-deazaguanosine-5'-aldehyde;
2',3'-O-cyclohexylidene-5-methylaminouridine-5'-aldehyde; and
2',3'-O-cyclohexylidene-5-methylaminouridine-5'-aldehyde.

EXAMPLE 5

This example illustrates methods, according to our invention, of preparing the compounds of Formula B of our invention. In this example a suspension of sodium amide in liquid ammonia is prepared by adding 1.6 g. of sodium to 100 ml. of liquid ammonia in the presence of a catalytic amount of ferric chloride under nitrogen. To this suspension is added 26.2 g. of methyltriphenylphosphonium bromide, followed by the addition of 200 ml. of anhydrous benzene. The resulting mixture is then heated under reflux until all of the ammonia is removed (about 2 hours). After removal of the ammonia, a solution containing 7.5 g. of 2',3'-O-cyclohexylideneuridine-5'-aldehyde hydrate in 50 ml. of anhydrous tetrahydrofuran is added dropwise with constant stirring, at 20° C. The resulting mixture is allowed to stand at room temperature with constant stirring until examination by thin layer chromatography reveals the absence of starting material (about 5 minutes is usually sufficient). Ten ml. of acetone is then added and the resulting mixture filtered. The filtrate is washed with saturated aqueous ammonium chloride solution, then water, and then dried over magnesium sulfate. The dried filtrate is then evaporated and the resulting syrup is chromatographed on silica gel, eluting with diethyl ether, affording 1-(2,3-O-cyclohexylidene-5,6-dideoxy-β-D-ribo-hex-5-enofuranosyl) uracil, which is then further purified by crystallization using a diethyl ether-hexane solvent.

By following the same procedure but using the corresponding nucleoside 5'-aldehyde derivatives from Examples 4 and 4a, the following compounds are respectively prepared:

1-(2,3-O-cyclohexylidene-5,6-dideoxy-β-D-ribo-hex-5-enofuranosyl)-5-fluorouracil;
1-(2,3-O-cyclohexylidene-5,6-dideoxy-β-D-ribo-hex-5-enofuranosyl)-5-chlorouracil;
1-(2,3-O-cyclohexylidene-5,6-dideoxy-β-D-ribo-hex-5-enofuranosyl)-5-bromouracil;
1-(2,3-O-cyclohexylidene-5,6-dideoxy-β-D-ribo-hex-5-enofuranosyl)-5-iodouracil;
1-(2,3-O-cyclohexylidene-5,6-dideoxy-β-D-ribo-hex-5-enofuranosyl)-5-methyluracil;
1-(2,3-O-cyclohexylidene-5,6-dideoxy-β-D-ribo-hex-5-enofuranosyl)-5-iso-propyluracil;
1-(2,3-O-cyclohexylidene-5,6-dideoxy-β-D-ribo-hex-5-enofuranosyl)-5-n-butyluracil;
1-(2,3-O-cyclohexylidene-5,6-dideoxy-β-D-ribo-hex-5-enofuranosyl)-5-trifluoromethyluracil;
1-(2,3-O-cyclohexylidene-5,6-dideoxy-β-D-ribo-hex-5-enofuranosyl)-5-benzyloxymethyluracil;
1-(2,3-O-cyclohexylidene-5,6-dideoxy-β-D-ribo-hex-5-enofuranosyl)-5-nitrouridine;
1-(2,3-O-cyclohexylidene-5,6-dideoxy-β-D-ribo-hex-5-enofuranosyl)-5-methylaminouracil;
1-(2,3-O-cyclohexylidene-5,6-dideoxy-β-D-ribo-hex-5-enofranosyl)-5-dimethylaminouracil;
1-(2,3-O-cyclohexylidene-5,6-dideoxy-β-D-ribo-hex-5-enofuranosyl)-6-azauracil;

1-(2,3-O-cyclohexylidene-5,6-dideoxy-β-D-ribo-hex-5-eno-furanosyl)-6-aza-5-methyluracil;
1-(2,3-O-cyclohexylidene-5,6-dideoxy-β-D-ribo-hex-5-eno-furanosyl)-guanine;
1-(2,3-O-cyclohexylidene-5,6-dideoxy-β-D-ribo-hex-5-eno-furanosyl)-8-azaguanine;
1-(2,3-O-cyclohexylidene-5,6-dideoxy-β-D-ribo-hex-5-eno-furanosyl)-7-deazaguanine;
1-(2,3-O-cyclohexylidene-5,6-dideoxy-β-D-ribo-hex-5-eno-furanosyl)-6-dimethylaminopurine; and
1-(2,3-O-cyclohexylidene-5,6-dideoxy-β-D-ribo-hex-5-eno-furanosyl)-hypoxanthine.

EXAMPLE 5a

This example illustrates further methods, according to our invention, of preparing the compounds of Formula B of our invention, wherein the base moiety of the nucleoside starting material is protected with a suitable protecting group. In this example, a suspension of sodium amide in liquid ammonia is prepared by adding 0.14 g. of sodium to 25 ml. of ammonia and a catalytic amount of ferric chloride under nitrogen. 2.5 grams of methyltriphenylphosphonium bromide is then added to the suspension, followed by the addition of 25 ml. of dry benzene. The resulting mixture is heated under reflux until all of the ammonia is displaced (about 2 hours). A solution of 0.25 g. of $N^6$-benzoyl-2',3'-O-isopropylideneadenosine-5'-aldehyde in 10 ml. of anhydrous tetrahydrofuran is then added with constant stirring at 20° C. The resulting mixture is allowed to stand at 20° C. with constant stirring until examination (by thin-layer chromatography) reveals the absence of aldehyde starting material. About 2 ml. of acetone is then added to decompose excess reagent, and the resulting mixture then filtered. The resulting filtrate is washed with saturated aqueous ammonium chloride, then water, and then dried over magnesium sulfate. The dried filtrate is then concentrated by vacuum evaporation affording a crude 9-(2,3-O-isopropylidene-5,6-dideoxy-β-D-ribo-hex - 5 - enofuranosyl)-$N^6$-benzoyl-adenine, which is then isolated by preparative thin-layer chromatography, eluting with ether. The resulting isolated crude benzoylated product is then dissolved in 20 ml. of a 1:1 (vol.) mixture of methanol and concentrated aqueous ammonia and is maintained at room temperature for twelve hours. The solvent is then evaporated under vacuum affording a solid residue, which is purified by preparative thin-layer chromatography, eluting with ether, to give 9-(2,3-O-isopropylidene-5,6-dideoxy-β-D-ribo-hex-5-enofuranosyl)-adenine which is further purified by recrystallization from ether.

By following the same procedure as above but using the corresponding $N^6$-benzoylated adenine derivative and $N^4$-benzoylated cytidine derivative from Example 4a as starting material, the following compounds are respectively prepared:

9-(2,3-O-cyclohexylidene-5,6-dideoxy-β-D-ribo-hex-5-enofuranosyl)adenine;
9-(2,3-O-cyclohexylidene-5,6-dideoxy-β-D-ribo-hex-5-enofuranosyl)-2-fluoroadenine;
9-(2,3-O-cyclohexylidene-5,6-dideoxy-β-D-ribo-hex-5-enofuranosyl)-2-azaadenine;
9-(2,3-O-cyclohexylidene-5,6-dideoxy-β-D-ribo-hex-5-enofuranosyl)-6-methylaminopurine;
9-(2,3-O-cyclohexylidene-5,6-dideoxy-β-D-ribo-hex-5-enofuranosyl)-7-deazaadenine;
9-(2,3-O-cyclohexylidene-5,6-dideoxy-β-D-ribo-hex-5-enofuranosyl)-8-azaadenine;
9-(2,3-O-cyclohexylidene-5,6-dideoxy-β-D-ribo-hex-5-enofuranosyl)-8-aza-9-deazaadenine;
1-(2,3-O-cyclohexylidene-5,6-dideoxy-β-D-ribo-hex-5-enofuranosyl)cytosine;
1-(2,3-O-cyclohexylidene-5,6-dideoxy-β-D-ribo-hex-5-enofuranosyl)-5-fluorocytosine;
1-(2,3-O-cyclohexylidene-5,6-dideoxy-β-D-ribo-hex-5-enofuranosyl)-5-chlorocytosine;
1-(2,3-O-cyclohexylidene-5,6-dideoxy-β-D-ribo-hex-5-enofuranosyl)-5-bromocytosine;
1-(2,3-O-cyclohexylidene-5,6-dideoxy-β-D-ribo-hex-5-enofuranosyl)-5-iodocytosine;
1-(2,3-O-cyclohexylidene-5,6-dideoxy-β-D-ribo-hex-5-enofuranosyl)-5-methylcytosine;
1-(2,3-O-cyclohexylidene-5,6-dideoxy-β-D-ribo-hex-5-enofuranosyl)-5-iso-propylcytosine;
1-(2,3-O-cyclohexylidene-5,6-dideoxy-β-D-ribo-hex-5-enofuranosyl)-5-n-butylcytosine;
1-(2,3-O-cyclohexylidene-5,6-dideoxy-β-D-ribo-hex-5-enofuranosyl)-5-trifluoromethylcytosine;
1-(2,3-O-cyclohexylidene-5,6-dideoxy-β-D-ribo-hex-5-enofuranosyl)-5-benzyloxymethylcytosine;
1-(2,3-O-cyclohexylidene-5,6-dideoxy-β-D-ribo-hex-5-enofuranosyl)-5-nitrocytidine;
1-(2,3-O-cyclohexylidene-5,6-dideoxy-β-D-ribo-hex-5-enofuranosyl)-5-methylaminocytosine;
1-(2,3-O-cyclohexylidene-5,6-dideoxy-β-D-ribo-hex-5-enofuranosyl)-5-dimethylaminocytosine;
1-(2,3-O-cyclohexylidene-5,6-dideoxy-β-D-ribo-hex-5-enofuranosyl)-6-azacytosine; and
1-(2,3-O-cyclohexylidene-5,6-dideoxy-β-D-ribo-hex-5-enofuranosyl)-6-aza-5-methylcytosine.

EXAMPLE 6

This example illustrates methods, according to our invention, of preparing the compounds of Formula C. In this example, a solution of 4 g. potassium permanganate in 80 ml. of water is added dropwise with constant stirring to a solution containing 4.25 g. of 1-(2,3-O-cyclohexylidene-5,6-dideoxy-β-D-ribo-hex - 5 - enofuranosyl)-uracil in 80 ml. of ethanol at 0° C., over a period of 30 minutes. The resulting mixture is then filtered and the resulting filter cake washed with 100 ml. hot ethanol. The ethanol washings are combined with the filtrate and then concentrated by vacuum evaporation to a viscous syrup, which is then subjected to chromatographic fractionation on silica gel eluting with methanol-chloroform (1:10 by vol.), affording a mixture of β-D-allo and α-L-talo epimers of 1-(2,3,-O-cyclohexylidenehexofuranosyl)uracil (i.e., 1 - (2,3-O-cyclohexylidine-β-D-allofuranosyl)-uracil and 1-(2,3-O-cyclohexylidene-α-L-talofuranosyl)-uracil.

By following the same procedure as above, the products of Examples 5 and 5a are respectively converted to epimeric mixtures of the corresponding β-D-allofuranosyl and α-L-talofuranosyl derivatives.

EXAMPLE 7

This example illustrates an alternative method, according to our invention, to that of Example 6 for the preparation of the β-D-allofuranosyl and α-L-talofuranosyl nucleosides from the olefinic products of Examples 5 and 5a via an intermediate epoxide. In this example, a solution of 2 g. of 1-(2,3,O-cyclohexylidene-5,6-dideoxy-β-D-ribo-hex-5-enofuranosyl)-uracil and 3.0 g. of m-chloroperbenzoic acid in 100 ml. of methylenechloride is stirred at room temperature for three days, the reaction being monitored by thin layer chromatography using ether. The solution is then washed with aqueous sodium bicarbonate and then water, dried over magnesium sulfate, and evaporated to dryness giving an epimeric mixture of 1-(5,6-anhydro-2,3-cyclohexylidene-β - D-allofuranosyl)-uracil and 1-(5,6-anhydro-2,3-cyclohexylidene-α-L-talofuranosyl)-uracil. This mixture of epimeric epoxide is dissolved together with 7.3 g. of sodium benzoate in 250 ml. of dimethylformamide and heated at 100 ° C. for two hours. The mixture is then filtered and the precipitate is washed with dimethylformamide. The combined filtrates are evaporated to dryness in vacuo and the residue is partitioned between ethyl acetate and water. The organic phase is washed with water, dried, and evaporated giving a mixture of benzoate esters. This material is dissolved in methanol (30 ml.) containing 160 mg. of sodium methoxide and stored overnight at room temperature. The mixture is then neutralized with Dowex 50 (H+) resin, filtered, and evaporated to dryness giving an epimeric mixture of 1-(2,3-O-cyclohexylidene-β-D-allofuranosyl) - uracil and 1-(2,3-O-cyclohexylidene-α-L-talofuranosyl)-uracil that is further purified by chromatography as in Example 6. By following the same procedure as above, the products of Examples 5 and 5a are respectively converted to epimeric mixtures of the corresponding β-D-allofuranosyl and α-L-talofuranosyl derivatives.

EXAMPLE 8

This example illustrates methods, according to our invention, of preparing the compound of Formula D. In this example, 2.7 g. of chlorotriphenylmethane is added to a solution containing 2 grams of an epimeric mixture of the uridine derivatives, prepared according to Example 6 or 7, in 25 ml. of anhydrous pyridine at 20° C. The resulting mixture is kept at ambient temperature for 24 hours and is then diluted with 50 ml. of chloroform and washed successively with 2 normal aqueous hydrochloric acid, then aqueous sodium bicarbonate solution, and then water. The washed chloroform solution is then dried over magnesium sulfate and concentrated by vacuum evaporation to a syrup. The resulting syrup is then subjected to preparative thin-layer chromatography eluting with a 1:5 (vol.) methanol-chloroform mixture, affording an epimeric mixture of 1-(2,3,-O-cyclohexylidene-6-O-trityl-β-D-allofuranosyl) - uracil and 1-(2,3,O - cyclohexylidene - 6 - O-trityl-α-L-talofuranosyl)-uracil.

By following the same procedure as above, the remaining epimeric product mixtures of Examples 6 and 7 are respectively converted to mixtures of the corresponding 6-O-trityl-β-D-allo- and α-L-talo epimers.

EXAMPLE 9

This example illustrates methods, according to our invention, of preparing the compounds of Formula E. In this example, 0.31 ml. of methanesulfonyl chloride is added to a solution containing 1.19 g. of an epimeric mixture of 1 - (2,3 - O - cyclohexylidene-6-O-trityl-β-D-allofuranosyl) - uracil and 1 - (2,3-O-cyclohexylidene-6-O-trityl-α-L-talofuranosyl)-uracil, prepared according to Example 8, in 10 ml. of pyridine at room temperature. The mixture is maintained at ambient temperature for twelve hours and then poured into 50 ml. of ice water. The resulting mixture is extracted with chloroform and the resulting chloroform solution is successively washed with 2 normal aqueous hydrochloric acid, then aqueous sodium bicarbonate solution, and then water. The chloroform solution is then dried over magnesium sulfate and concentrated by vacuum evaporation to a syrup, which is shown to consist of two components by thin-layer chromatography using ether as eluant. 1-(2,3-O-cyclohexylidene - 5 - O - mesyl-6-O-trityl-β-D-allofuranosyl) uracil and 1 - (2,3 - O-cyclohexylidene-5-O-mesyl-6-O-trityl-α-L-talofuranosyl)-uracil are isolated in pure crystalline form by preparative thin layer chromatography using ether as eluant followed by crystallization from ether. Alternatively the epimeric mixture is used directly in the subsequent steps.

By following the same procedure as above, the remaining 6-O-trityl epimeric derivative mixtures of Example 8 are respectively converted to epimeric mixtures of the corresponding 5-O-mesyl-6-O-trityl-β-D-allo- and 5-O-mesyl-6-O-trityl-α-L-talofuranosyl nucleoside derivatives.

EXAMPLE 10

This example illustrates methods, according to our invention, of preparing the compounds of Formula F (5-azido - 5 - deoxy-β-D-allo, and α-L-talofuranosyl epimeric mixtures). In this example, 1.25 g. of an epimeric mixture of 1-(2,3-O-cyclohexylidene-5-O-mesyl-6-O-trityl-β-D-allofuranosyl) - uracil and 1-(2,3-O-cyclohexylidene-5-O-mesyl-6-O-trityl - α - L-talofuranosyl)-uracil, prepared according to Example 9, is heated at 90° C. with 0.75 g. of sodium azide in 25 ml. of dimethylformamide until examination by thin-layer chromatography reveals the reaction to be complete (about four hours). The dimethylformamide solvent is removed by vacuum evaporation and a resulting residue is partitioned between chloroform and water. The chloroform extracts are combined, dried over magnesium sulfate and then concentrated by vacuum evaporation affording a solid residue which is then subjected to thin-layer chromatography, eluting with ether, affording an epimeric mixture of 1-(5-azido-2,3-O-cyclohexylidene-5-deoxy-6-O-trityl - β - D-allofuranosyl)-uracil and 1-(5-azido-2,3 - O - cyclohexylidene - 5 - deoxy-6-O-trityl-α-L-talofuranosyl)-uracil.

By following the same procedure as above, the remaining epimeric mixture products of Example 9 are converted to the corresponding epimeric mixtures of 5-azido-5-deoxy derivatives.

EXAMPLE 11

This example illustrates methods, according to our invention, of preparing the compounds of Formula G by hydrogenation of the 5'-azido function to afford the corresponding 5'-amino derivative. In this example, 0.8 g. of an epimeric mixture of 1-(5-azido-2,3-O-cyclohexylidene-5-deoxy-6 - O - trityl-β-D-allofuranosyl)-uracil and 1-(5-azido-2,3-O-cyclohexylidene- 5 -deoxy-6-O-trityl-α-L-talofuranosyl)-uracil, prepared according to Example 6, is hydrogenated in 25 ml. of ethanol over a 5% palladium/barium sulfate catalyst and at 20° C., in a hydrogen atmosphere for 6 hours. The catalyst is then removed by filtration and the resulting filtrate concentrated by vacuum evaporation to a syrup, containing an epimeric mixture of 1-(5-amino-2,3-O-cyclohexylidene - 5 - deoxy-6-O-trityl-β-D-allofuranosyl)-uracil and 1-(5-amino-2,3-O-cyclohexylidene-5-deoxy-6-O-trityl-α - L - talofuranosyl)-uracil. The mixture is then resolved into its respective isomers by preparative thin-layer chromatography eluting with 1:5 (by volume) mixture of methanol and chloroform.

By following the same procedure as above, the 5-azido epimeric mixtures, prepared according to Example 10, are respectively converted to the corresponding epimeric mixture of 5-amino derivatives and then resolved into their respective 5-amino 5-deoxy-β-D-allofuranosyl and α-L-talofuranosyl isomers.

EXAMPLE 11a

This example illustrates an alternative method, according to our invention, of reduction of the azido function in the epimeric 5-azido-2,3-O-cyclohexylidene-6-O-tritylhexofuranosyl nucleosides to the corresponding 5-amino epimers. This method is of particular value when dealing with compounds of Formula F wherein B is 5-nitrouracil, 5-iodouracil, 5-bromouracil, 5-nitrocytosine, 5-iodocytosine and 5-bromocytosine since using the catalytic reduction method of Example 11 some reduction of these nitro- and halo-substituents accompanies the desired process. In this example an epimeric mixture of 1-(5-azido-2,3-O-cyclohexylidene - 5 - deoxy-6-O-trityl-β-D-allofuranosyl)-5-nitrouracil and 1-(5-azido-2,3-O-cyclohexylidene-5-deoxy-6-O-trityl - α - L - talofuranosyl)-5-nitrouracil (0.8 g.) and sodium borohydride (600 mg.) in a mixture of dimethylformamide (2 ml.) and methanol (10 ml.) is stirred at room temperature until thin layer chromatography using chloroform-methanol (5:1) shows completion of the reduction. The solvent is then evaporated in vacuo and the residue is dissolved in chloroform and extracted with water. The dried chloroform solution is then evaporated in vacuo leaving a mixture of 1-(5-amino-2,3-O-cyclohexylidene - 5 - deoxy - 6 - O-trityl-β-D-allofuranosyl)-5-nitrouracil and 1-(5-amino-2,3-O-cyclohexylidene - 5 - deoxy - 6 - O - trityl - α - L - talofuranosyl)-5-nitrouracil which is separated into its individual epimers by preparative thin layer chromatography using chloroform-methanol (5:1).

EXAMPLE 12

This example illustrates methods, according to our invention, of converting the 5'-hydroxy nucleoside epimers (e.g. compounds of Formula D) to the corresponding 5'-keto compounds (Formula $D_1$). In this example, 0.5 g. of an epimeric mixture of 1-(2,3-O-cyclohexylidene-6-O-trityl-β-D-allofuranosyl)-uracil and 1-(2,3-O-cyclohexylidene-6-O-trityl-α-L-talofuranosyl)-uracil, prepared according to Example 8, is dissolved in a mixture of 5 ml. of dimethyl sulfoxide and 2.5 ml. of acetic anhydride at ambient temperature. The solution is maintained at ambient temperature for 12 hours and then 0.5 ml. of pyridine is added, followed by the dropwise addition of water until crystallization occurs. The resulting crystals are recovered by filtration, and then further purified by recrystallization from methanol, affording 1-(2,3-O-cyclohexylidene-6-O-trityl - β - D - ribo-hexo-1,4-furanos-5-ulosyl)-uracil.

By following the same procedure as above, the remaining epimeric mixtures, enumerated in Example 8, are converted to the corresponding 5-keto derivatives.

EXAMPLE 13

This example illustrates methods, according to our invention, of preparing 5'-oximino nucleoside derivatives (Formula $D_2$). In this example, 800 mg. of 1-(2,3-O-cyclohexylidene-6-O-trityl-β-D-ribo - 1,4 - furanos-5-ulosyl)-uracil is dissolved in a mixture containing 150 mg. of hydroxylamine hydrochloride, 5.0 ml. of pyridine, 5.0 ml. of ethanol, and 5.0 ml. of water, at room temperature. The resulting mixture is allowed to stand for 3 hours at room temperature and is then diluted with 100 ml. of water and extracted with chloroform. The chloroform extracts are combined and the combined extracts are then washed successively with aqueous 1 normal hydrochloric acid, then aqueous sodium bicarbonate solution, and then water. The washed extract is then dried over magnesium sulfate, and then concentrated by vacuum evaporation to a syrup, which is then crystallized from aqueous ethanol affording 1-(2,3-O-cyclohexylidene - 6 - O - trityl-β-D-ribo-hexo-1,4-furanos-5-ulosyl)-uracil oxime. By following the same procedure as above, the remaining 5'-keto products of Example 12 are respectively converted to the corresponding 5'-oximino derivatives.

EXAMPLE 14

This example illustrates a method, according to our invention, for the preparation of epimeric D-allo and L-talo isomers of 5-amino-2,3-O-cyclohexylidene-5-deoxy-6-O-trityl-hexofuranosyl nucleosides (e.g. Formula G) by reduction of the corresponding 5-oximino compounds (e.g. Formula $D_2$). In this example, 1.5 g. of 1-(2,3-O-cyclohexylidene-6-O-trityl-β-D-ribo-hexo - 1,4 - furanos-5-ulosyl)-uracil oxime is dissolved in 50 ml. of methanol and vigorously stirred for 24 hours with 1 g. of activated Raney nickel catalyst in an atmosphere of hydrogen. The mixture was then filtered and the filtrate was evaporated to dryness giving a mixture of 1-(5-amino-2,3-O-cyclohexylidene - 5 - deoxy-6-O-trityl-β-D-allofuranosyl)-uracil and 1-(5-amino - 2,3 - O - cyclohexylidene-5-deoxy-6-O-trityl-α-L-talofuranosyl)-uracil similar to that obtained in Examples 11 and 11a. Further resolution of these isomers is then accomplished according to Example 11.

By following the same procedure as above, only using the other oximino products of Example 13 as starting materials, the corresponding 5-amino-5-deoxy-D-allo- and 5-amino-5-deoxy-L-talofuranosyl nucleosides were obtained.

EXAMPLE 15

This example illustrates methods, according to our invention, of preparing the compounds of Formula H (removal of the 6'-protecting group by hydrolysis of the corresponding compounds of Formula G). In this example, a solution containing 0.4 g. of an epimeric mixture of 1-(5-amino - 2,3 - O - cyclohexylidene-5-deoxy-6-O-trityl-β-D-allofuranosyl)-uracil and 1-(5-amino-2,3-O-cyclohexylidene-5-deoxy-6-O-trityl-α-L-talofuranosyl)-uracil in 10 ml. of aqueous 80% acetic acid is heated at 100° C. for 30 minutes, and then concentrated by vacuum evaporation to a syrup which is then further evaporated with toluene several times. The resulting residue is then dissolved in 5 ml. of hot ethanol. Water is then added to this solution to crystallize the triphenylcarbinol reaction by-product. The resulting triphenylcarbinol crystals are removed by filtration and the resulting filtrate is then concentrated by vacuum evaporation and traces of remaining water removed by azeotropic distillation with ethanol. The resulting residue from the azeotropic distillation is predominantly an epimeric mixture of 1-(5-amino-2,3-O-cyclohexylidene-5-deoxy-β-D-allofuranosyl)-uracil and 1-(5-amino-2,3-O-cyclohexylidene-5-deoxy-α-L-talofuranosyl)-uracil, which is then separated into its respective isomers by thin-layer chromatography eluting with a 1:5 (vol.) mixture of methanol and chloroform.

By following the same procedure as above, the corresponding epimeric mixtures prepared according to Examples 11, 11a and Example 14 are respectively converted into the corresponding epimeric mixtures of the 5-amino-2,3-O-cyclohexylidene - 5 - deoxy-hexofuranosyl derivatives. The respective epimeric mixtures are then resolved into the corresponding D-allo and L-talo isomers by preparative thin-layer chromatography, affording respectively the following compounds:

1-(5-amino-2,3-O-cyclohexylidene-5-deoxy-β-D-allofuranosyl)-5-fluorouracil;
1-(5-amino-2,3-O-cyclohexylidene-5-deoxy-α-L-talofuranosyl)-5-fluorouracil;
1-(5-amino-2,3-O-cyclohexylidene-5-deoxy-β-D-allofuranosyl)-5-chlorouracil;
1-(5-amino-2,3-O-cyclohexylidene-5-deoxy-α-L-talofuranosyl)-5-chlorouracil;
1-(5-amino-2,3-O-cyclohexylidene-5-deoxy-β-D-allofuranosyl)-5-bromouracil;
1-(5-amino-2,3-O-cyclohexylidene-5-deoxy-α-L-talofuranosyl)-5-bromouracil;
1-(5-amino-2,3-O-cyclohexylidene-5-deoxy-β-D-allofuranosyl)-5-iodouracil;
1-(5-amino-2,3-O-cyclohexylidene-5-deoxy-α-L-talofuranosyl)-5-iodouracil;
1-(5-amino-2,3-O-cyclohexylidene-5-deoxy-β-D-allofuranosyl)-5-methyluracil;
1-(5-amino-2,3-O-cyclohexylidene-5-deoxy-α-L-talofuranosyl)-5-methyluracil;
1-(5-amino-2,3-O-cyclohexylidene-5-deoxy-β-D-allofuranosyl)-5-isopropyluracil;
1-(5-amino-2,3-O-cyclohexylidene-5-deoxy-α-L-talofuranosyl)-5-isopropyluracil;
1-(5-amino-2,3-O-cyclohexylidene-5-deoxy-β-D-allofuranosyl)-5-n-butyluracil;
1-(5-amino-2,3-O-cyclohexylidene-5-deoxy-α-L-talofuranosyl)-5-n-butyluracil;
1-(5-amino-2,3-O-cyclohexylidene-5-deoxy-β-D-allofuranosyl)-5-trifluoromethyluracil;
1-(5-amino-2,3-O-cyclohexylidene-5-deoxy-α-L-talofuranosyl)-5-trifluoromethyluracil;
1-(5-amino-2,3-O-cyclohexylidene-5-deoxy-β-D-allofuranosyl)-5-hydroxymethyluracil;
1-(5-amino-2,3-O-cyclohexylidene-5-deoxy-α-L-talofuranosyl)-5-hydroxymethyluracil;
1-(5-amino-2,3-O-cyclohexylidene-5-deoxy-β-D-allofuranosyl)-5-nitrouracil;
1-(5-amino-2,3-O-cyclohexylidene-5-deoxy-α-L-talofuranosyl)-5-nitrouracil;
1-(5-amino-2,3-O-cyclohexylidene-5-deoxy-β-D-allofuranosyl)-5-methylaminouracil;

1-(5-amino-2,3-O-cyclohexylidene-5-deoxy-α-L-
talofuranosyl)-5-methylaminouracil;
1-(5-amino-2,3-O-cyclohexylidene-5-deoxy-β-D-
allofuranosyl)-5-dimethylaminouracil;
1-(5-amino-2,3-O-cyclohexylidene-5-deoxy-α-L-
talofuranosyl)-5-dimethylaminouracil;
1-(5-amino-2,3-O-cyclohexylidene-5-deoxy-β-D-
allofuranosyl)-6-azauracil;
1-(5-amino-2,3-O-cyclohexylidene-5-deoxy-α-L-
talofuranosyl)-6-azauracil;
1-(5-amino-2,3-O-cyclohexylidene-5-deoxy-β-D-
allofuranosyl)-6-aza-5-methyluracil;
1-(5-amino-2,3-O-cyclohexylidene-5-deoxy-α-L-
talofuranosyl)-6-aza-5-methyluracil;
1-(5-amino-2,3-O-cyclohexylidene-5-deoxy-β-D-
allofuranosyl)-cytosine;
1-(5-amino-2,3-O-cyclohexylidene-5-deoxy-α-L-
talofuranosyl)-cytosine;
1-(5-amino-2,3-O-cyclohexylidene-5-deoxy-β-D-
allofuranosyl)-5-fluorocytosine;
1-(5-amino-2,3-O-cyclohexylidene-5-deoxy-α-L-
talofuranosyl)-5-fluorocytosine;
1-(5-amino-2,3-O-cyclohexylidene-5-deoxy-β-D-
allofuranosyl)-5-chlorocytosine;
1-(5-amino-2,3-O-cyclohexylidene-5-deoxy-α-L-
talofuranosyl)-5-chlorocytosine;
1-(5-amino-2,3-O-cyclohexylidene-5-deoxy-β-D-
allofuranosyl)-5-bromocytosine;
1-(5-amino-2,3-O-cyclohexylidene-5-deoxy-α-L-
talofuranosyl)-5-bromocytosine;
1-(5-amino-2,3-O-cyclohexylidene-5-deoxy-β-D-
allofuranosyl)-5-iodocytosine;
1-(5-amino-2,3-O-cyclohexylidene-5-deoxy-α-L-
talofuranosyl)-5-iodocytosine;
1-(5-amino-2,3-O-cyclohexylidene-5-deoxy-β-D-
allofuranosyl)-5-methylcytosine;
1-(5-amino-2,3-O-cyclohexylidene-5-deoxy-α-L-
talofuranosyl)-5-methylcytosine;
1-(5-amino-2,3-O-cyclohexylidene-5-deoxy-β-D-
allofuranosyl)-5-isopropylcytosine;
1-(5-amino-2,3-O-cyclohexylidene-5-deoxy-α-L-
talofuranosyl)-5-isopropylcytosine;
1-(5-amino-2,3-O-cyclohexylidene-5-deoxy-β-D-
allofuranosyl)-5-n-butylcytosine;
1-(5-amino-2,3-O-cyclohexylidene-5-deoxy-α-L-
talofuranosyl)-5-n-butylcytosine;
1(5-amino-2,3-O-cyclohexylidene-5-deoxy-β-D-
allofuranosyl)-5-trifluoromethylcytosine;
1-(5-amino-2,3-O-cyclohexylidene-5-deoxy-α-L-
talofuranosyl)-5-trifluoromethylcytosine;
1-(5-amino-2,3-O-cyclohexylidene-5-deoxy-β-D-
allofuranosyl)-5-hydroxymethylcytosine;
1-(5-amino-2,3-O-cyclohexylidene-5-deoxy-α-L-
talofuranosyl)-5-hydroxymethylcytosine;
1-(5-amino-2,3-O-cyclohexylidene-5-deoxy-β-D-
allofuranosyl)-5-nitrocytosine;
1-(5-amino-2,3-O-cyclohexylidene-5-deoxy-α-L-
talofuranosyl)-5-nitrocytosine;
1-(5-amino-2,3-O-cyclohexylidene-5-deoxy-β-D-
allofuranosyl)-5-methylaminocytosine;
1-(5-amino-2,3-O-cyclohexylidene-5-deoxy-α-L-
talofuranosyl)-5-methylaminocytosine;
1-(5-amino-2,3-O-cyclohexylidene-5-deoxy-
β-D-allofuranosyl)-5-dimethylaminocytosine;
1-(5-amino-2,3-O-cyclohexylidene-5-deoxy-
α-L-talofuranosyl)-5-dimethylaminocytosine;
1-(5-amino-2,3-O-cyclohexylidene-5-deoxy-
β-D-allofuranosyl)-6-azacytosine;
1-(5-amino-2,3-O-cyclohexylidene-5-deoxy-
α-L-talofuranosyl)-6-azacytosine;
1-(5-amino-2,3-O-cyclohexylidene-5-deoxy-
β-D-allofuranosyl)-6-aza-5-methylcytosine;
1-(5-amino-2,3-O-cyclohexylidene-5-deoxy-
α-L-talofuranosyl)-6-aza-5-methylcytosine;
9-(5-amino-2,3-O-cyclohexylidene-5-deoxy-
β-D-allofuranosyl)-guanine;
9-(5-amino-2,3-O-cyclohexylidene-5-deoxy-
α-L-talofuranosyl)-guanine;
9-(5-amino-2,3-O-cyclohexylidene-5-deoxy-
β-D-allofuranosyl)-hypoxanthine;
9-(5-amino-2,3-O-cyclohexylidene-5-deoxy-
α-L-talofuranosyl)-hypoxanthine;
9-(5-amino-2,3-O-cyclohexylidene-5-deoxy-
β-D-alofuranosyl)-adenine;
9-(5-amino-2,3-O-cyclohexylidene-5-deoxy-
α-L-talofuranosyl)-adenine;
9-(5-amino-2,3-O-cyclohexylidene-5-deoxy-
β-D-allofuranosyl)-fluoroadenine;
9-(5-amino-2,3-O-cyclohexylidene-5-deoxy-
α-L-talofuranosyl)-fluoroadenine;
9-(5-amino-2,3-O-cyclohexylidene-5-deoxy-
β-D-allofuranosyl)-2-azaadenine;
9-(5-amino-2,3-O-cyclohexylidene-5-deoxy-
α-L-talofuranosyl)-2-azaadenine;
9-(5-amino-2,3-O-cyclohexylidene-5-deoxy-
β-D-allofuranosyl)-6-methylaminopurine;
9-(5-amino-2,3-O-cyclohexylidene-5-deoxy-
α-L-talofuranosyl)-6-methylaminopurine;
9-(5-amino-2,3-O-cyclohexylidene-5-deoxy-
β-D-allofuranosyl)-6-dimethylaminopurine;
9-(5-amino-2,3-O-cyclohexylidene-5-deoxy-
α-L-talofuranosyl)-6-dimethylaminopurine;
9-(5-amino-2,3-O-cyclohexylidene-5-deoxy-
β-D-allofuranosyl)-7-deazaadenine;
9-(5-amino-2,3-O-cyclohexylidene-5-deoxy-
α-L-talofuranosyl)-7-deazaadenine;
9-(5-amino-2,3-O-cyclohexylidene-5-deoxy-
β-D-allofuranosyl)-8-azaadenine;
9-(5-amino-2,3-O-cyclohexylidene-5-deoxy-
α-L-talofuranosyl)-8-azaadenine;
9-(5-amino-2,3-O-cyclohexylidene-5-deoxy-
β-D-allofuranosyl)-8-aza-9-deazaadenine;
9-(5-amino-2,3-O-cyclohexylidene-5-deoxy-
α-L-talofuranosyl)-8-aza-9-deazaadenine;
9-(5-amino-2,3-O-cyclohexylidene-5-deoxy-
β-D-allofuranosyl)-8-azaguanine;
9-(5-amino-2,3-O-cyclohexylidene-5-deoxy-
α-L-talofuranosyl)-8-azaguanine;
9-(5-amino-2,3-O-cyclohexylidene-5-deoxy-
β-D-allofuranosyl)-7-deazaguanine;
9-(5-amino-2,3-O-cyclohexylidene-5-deoxy-
α-L-talofuranosyl)-7-deazaguanine.

EXAMPLE 16

This example illustrates a method according to our invention of preparing the compounds of Formulas Ia and Ib of our invention. In this example, a solution of 300 mg. of 1-(5-amino-2,3-O-cyclohexylidene-5-deoxy-β-D-allofuranosyl)-uracil in 10 ml. of 80% acetic acid is heated at 100° C. for 3 to 4 hours, the progress of the reaction being followed by thin layer chromatography using chloroform-methanol (5:1). The solvent is then evaporated in vacuo and the residue is triturated with hexane to remove cyclohexanone. The final residue is purified by preparative thin layer chromatography on microcrystalline cellulose using butanol-water (86:14) as eluant. The Ninhydrin and periodate positive band is eluted from the cellulose with aqueous methanol (1:9) and the solution is evaporated to dryness giving homogeneous 1-(5-amino-5-deoxy-β-D-allofuranosyl)-uracil which is then crystallized from ethanol.

By following the same procedure as above only using the products of Example 15 as starting materials, the corresponding 5-amino-5-deoxy-β-D-allofuranosyl and 5-amino-5-deoxy-α-L-talofuranosyl nucleosides are obtained.

It is clear that if the intermediate 2,3-O-cyclohexylidene derivatives of Example 15 are not required as such, the processes of Examples 15 and 16 can be combined. Thus, treatment of the products of Examples 11, 11a and 14 with 80% acetic acid at 100° for 3 to 4 hours as above directly removes both the 6-O-trityl and 2,3-O-cyclohexylidene groups in a single reaction and affords the corresponding 5-amino-5-deoxy-β-D-allofuranosyl and 5-amino-5-deoxy-α-L-talofuranosyl nucleosides of Formulas Ia and Ib.

1-(5-amino-5-deoxy-β-D-allofuranosyl)-5-fluorouracil;
1-(5-amino-5-deoxy-β-D-allofuranosyl)-5-chlorouracil;
1-(5-amino-5-deoxy-β-D-allofuranosyl)-5-bromouracil;
1-(5-amino-5-deoxy-β-D-allofuranosyl)-5-iodouracil;
1-(5-amino-5-deoxy-β-D-allofuranosyl)-5-methyluracil;
1-(5-amino-5-deoxy-β-D-allofuranosyl)-5-iso-propyluracil;
1(5-amino-5-deoxy-β-D-allofuranosyl)-5-n-butyluracil;
1-(5-amino-5-deoxy-β-D-allofuranosyl)-5-trifluoromethyluracil;
1-(5-amino-5-deoxy-β-D-allofuranosyl)-5-hydroxymethyluracil;
1-(5-amino-5-deoxy-β-D-allofuranosyl)-5-nitrouracil;
1-(5-amino-5-deoxy-β-D-allofuranosyl)-5-methylaminouracil;
1-(5-amino-5-deoxy-β-D-allofuranosyl)-5-dimethylaminouracil;
1-(5-amino-5-deoxy-β-D-allofuranosyl)-6-azauracil;
1-(5-amino-5-deoxy-β-D-allofuranosyl)-6-aza-5-methyluracil;
1-(5-amino-5-deoxy-β-D-allofuranosyl)-cytosine,
1-(5-amino-5-deoxy-β-D-allofuranosyl)-5-fluorocytosine,
1-(5-amino-5-deoxy-β-D-allofuranosyl)-5-chlorocytosine;
1-(5-amino-5-deoxy-β-D-allofuranosyl)-5-bromocytosine;
1-(5-amino-5-deoxy-β-D-allofuranosyl)-5-iodocytosine;
1-(5-amino-5-deoxy-β-D-allofuranosyl)-5-methylcytosine;
1-(5-amino-5-deoxy-β-D-allofuranosyl)-5-iso-propylcytosine;
1-(5-amino-5-deoxy-β-D-allofuranosyl)-5-n-butylcytosine;
1-(5-amino-5-deoxy-β-D-allofuranosyl)-5-trifluoromethylcytosine;
1-(5-amino-5-deoxy-β-D-allofuranosyl)-5-hydroxymethylcytosine;
1-(5-amino-5-deoxy-β-D-allofuranosyl)-5-nitrocytosine;
1-(5-amino-5-deoxy-β-D-allofuranosyl)-5-methylaminocytosine;
1-(5-amino-5-deoxy-β-D-allofuranosyl)-5-dimethylaminocytosine;
1-(5-amino-5-deoxy-β-D-allofuranosyl)-6-azacytosine;
1-(5-amino-5-deoxy-β-D-allofuranosyl)-6-aza-5-methylcytosine;
9-(5-amino-5-deoxy-β-D-allofuranosyl)-adenine;
9-(5-amino-5-deoxy-β-D-allofuranosyl)-2-fluoroadenine;
9-(5-amino-5-deoxy-β-D-allofuranosyl)-2-azaadenine;
9-(5-amino-5-deoxy-β-D-allofuranosyl)-6-methylaminopurine,
9-(5-amino-5-deoxy-β-D-allofuranosyl)-6-dimethylaminopurine;
9-(5-amino-5-deoxy-β-D-allofuranosyl)-7-deazaadenine;
9-(5-amino-5-deoxy-β-D-allofuranosyl)-8-azaadenine;
9-(5-amino-5-deoxy-β-D-allofuranosyl)-8-aza-9-deazaadenine;
9-(5-amino-5-deoxy-β-D-allofuranosyl)-hypoxanthine;
9-(5-amino-5-deoxy-β-D-allofuranosyl)-guanine;
9-(5-amino-5-deoxy-β-D-allofuranosyl)-8-azaguanine;
9-(5-amino-5-deoxy-β-D-allofuranosyl)-7-deazaguanine;
1-(5-amino-5-deoxy-α-L-talofuranosyl)-uracil;
1-(5-amino-5-deoxy-α-L-talofuranosyl)-5-fluorouracil;
1-(5-amino-5-deoxy-α-L-talofuranosyl)-5-chlorouracil;
1-(5-amino-5-deoxy-α-L-talofuranosyl)-5-bromouracil;
1-(5-amino-5-deoxy-α-L-talofuranosyl)-5-iodouracil;
1-(5-amino-5-deoxy-α-L-talofuranosyl)-5-methyluracil;
1-(5-amino-5-deoxy-α-L-talofuranosyl)-5-iso-propyluracil;
1-(5-amino-5-deoxy-α-L-talofuranosyl)-5-n-butyluracil;
1-(5-amino-5-deoxy-α-L-talofuranosyl)-5-trifluoromethyluracil;
1-(5-amino-5-deoxy-α-L-talofuranosyl)-5-hydroxymethyluracil;
1-(5-amino-5-deoxy-α-L-talofuranosyl)-5-nitrouracil;
1-(5-amino-5-deoxy-α-L-talofuranosyl)-5-methylaminouracil;
1-(5-amino-5-deoxy-α-L-talofuranosyl)-5-dimethylaminouracil;
1-(5-amino-5-deoxy-α-L-talofuranosyl)-6-azauracil;
1-(5-amino-5-deoxy-α-L-talofuranosyl)-6-aza-5-methyluracil;
1-(5-amino-5-deoxy-α-L-talofuranosyl)-cytosine;
1-(5-amino-5-deoxy-α-L-talofuranosyl)-5-fluorocytosine;
1-(5-amino-5-deoxy-α-L-talofuranosyl)-5-chlorocytosine;
1-(5-amino-5-deoxy-α-L-talofuranosyl)-5-bromocytosine;
1-(5-amino-5-deoxy-α-L-talofuranosyl)-5-iodocytosine;
1-(5-amino-5-deoxy-α-L-talofuranosyl)-5-methylcytosine;
1-(5-amino-5-deoxy-α-L-talofuranosyl)-5-iso-propylcytosine;
1-(5-amino-5-deoxy-α-L-talofuranosyl)-5-n-butylcytosine;
1-(5-amino-5-deoxy-α-L-talofuranosyl)-5-trifluoromethylcytosine;
1-(5-amino-5-deoxy-α-L-talofuranosyl)-5-hydroxymethylcytosine;
1-(5-amino-5-deoxy-α-L-talofuranosyl)-5-nitrocytosine;
1-(5-amino-5-deoxy-α-L-talofuranosyl)-5-methylaminocytosine;
1-(5-amino-5-deoxy-α-L-talofuranosyl)-5-dimethylaminocytosine;
1-(5-amino-5-deoxy-α-L-talofuranosyl)-6-azacytosine;
1-(5-amino-5-deoxy-α-L-talofuranosyl)-6-aza-5-methylcytosine;
9-(5-amino-5-deoxy-α-L-talofuranosyl)-adenine;
9-(5-amino-5-deoxy-α-L-talofuranosyl)-2-fluoroadenine;
9-(5-amino-5-deoxy-α-L-talofuranosyl)-2-azaadenine;
9-(5-amino-5-deoxy-α-L-talofuranosyl)-6-methylaminopurine;
9-(5-amino-5-deoxy-α-L-talofuranosyl)-6-dimethylaminopurine;
9-(5-amino-5-deoxy-α-L-talofuranosyl)-7-deazaadenine;
9-(5-amino-5-deoxy-α-L-talofuranosyl)-8-azaadenine;
9-(5-amino-5-deoxy-α-L-talofuranosyl)-8-aza-9-deazaadenine;
9-(5-amino-5-deoxy-α-L-talofuranosyl)-hypoxanthine,
9-(5-amino-5-deoxy-α-L-talofuranosyl)-guanine;
9-(5-amino-5-deoxy-α-L-talofuranosyl)-8-azaguanine;
9-(5-amino-5-deoxy-α-L-talofuranosyl)-7-deazaguanine.

EXAMPLE 17

This example illustrates a method, according to our invention, for conversion of the 5-amino-5-deoxy-β-D-allo and/or 5-amino-5-deoxy-α-L-talofuranosyl nucleosides of this invention into the corresponding 5'-amino-5-deoxyhexfuranouronic acid derivatives (e.g. conversion of a compound of Formula H into the compounds of Formulas Ic and Id of our invention). In this example, a solution of 1 g. of 1-(5-amino-2,3-O-cyclohexylidene-5-deoxy-β-D-allofuranosyl)-uracil and 5 g. of chloroacetic anhydride in methanol (25 ml.) is stirred at room temperature for 12 hours at which point thin layer chromatography using chloroform-methanol (5:1) shows complete conversion of the starting amine into its chloroacetamide derivative. The solvent is then largely evaporated in vacuo and the residue is dissolved in chloroform and washed with sodium bicarbonate solution followed by water. The organic phase is evaporated and the residue is dissolved in a mixture of pyridine (12 ml.) and acetic acid (4 ml.). To this solution is added a solution of chromic oxide (670 mg.) in water (1 ml.) and acetic acid (9 ml.) and the resulting mixture is heated at 70° for 20 hours. It is then poured into ice water and the resulting precipitate is collected by filtration and washed with water. This crude product is then dissolved in 80% acetic acid and heated at 100° for 3 hours to remove the cyclohexylidene group. After evaporation of the solvent in vacuo the residue was triturated with ether and the insoluble residue was dissolved together with thiourea (380 mg.) in ethanol (25 ml.) and heated under reflux for 2 hours. Water (10 ml.) was added and heating was continued for 15 minutes. The solvents were evaporated in vacuo and the residue was dissolved in water, brought to pH 2 with hydrochloric acid and passed through a column of activated carbon. The carbon is then thoroughly washed with water and the nucleosides are then eluted with a solution of 2% amonium hydroxide in 50% ethanol. Final purification of the desired 1-(5-amino-5-deoxy-β-D-allofuranosyluronic acid)-uracil is then achieved by chromatography on microcrystalline cellulose (Avicel) using butanol-acetic acid-water (5:2:3).

By following the same procedure as above but using the other products of Example 15 as starting materials, the corresponding 5 - amino - 5-deoxy-β-D-allofuranosyluronic acid and 5-amino-5-deoxy-α - L - talofuranosyluronic acid nucleosides are obtained.

1-(5-amino-5-deoxy-β-D-allofuranosyluronic acid)-5-fluorouracil;
1-(5-amino-5-deoxy-β-D-allofuranosyluronic acid)-5-chlorouracil;
1-(5-amino-5-deoxy-β-D-allofuranosyluronic acid)-5-bromouracil;
1-(5-amino-5-deoxy-β-D-allofuranosyluronic acid)-5-iodouracil;
1-(5-amino-5-deoxy-β-D-allofuranosyluronic acid)-5-methyluracil;
1-(5-amino-5-deoxy-β-D-allofuranosyluronic acid)-5-iso-propyluracil;
1-(5-amino-5-deoxy-β-D-allofuranosyluronic acid)-5-n-butyluracil;
1-(5-amino-5-deoxy-β-D-allofuranosyluronic acid)-5-trifluoromethyluracil;
1-(5-amino-5-deoxy-β-D-allofuranosyluronic acid)-5-hydroxymethyluracil;
1-(5-amino-5-deoxy-β-D-allofuranosyluronic acid)-5-nitrouracil;
1-(5-amino-5-deoxy-β-D-allofuranosyluronic acid)-5-methylaminouracil;
1-(5-amino-5-deoxy-β-D-allofuranosyluronic acid)-5-dimethylaminouracil;
1-(5-amino-5-deoxy-β-D-allofuranosyluronic acid)-6-azauracil;
1-(5-amino-5-deoxy-β-D-allofuranosyluronic acid)-6-aza-5-methyluracil;
1-(5-amino-5-deoxy-β-D-allofuranosyluronic acid)-cytosine;
1-(5-amino-5-deoxy-β-D-allofuranosyluronic acid)-5-fluorocytosine;
1-(5-amino-5-deoxy-β-D-allofuranosyluronic acid)-5-chlorocytosine;
1-(5-amino-5-deoxy-β-D-allofuranosyluronic acid)-5-bromocytosine;
1-(5-amino-5-deoxy-β-D-allofuranosyluronic acid)-5-iodocytosine;
1-(5-amino-5-deoxy-β-D-allofuranosyluronic acid)-5-methylcytosine;
1-(5-amino-5-deoxy-β-D-allofuranosyluronic acid)-5-iso-propylcytosine;
1-(5-amino-5-deoxy-β-D-allofuranosyluronic acid)-5-n-butylcytosine;
1-(5-amino-5-deoxy-β-D-allofuranosyluronic acid)-5-trifluoromethylcytosine;
1-(5-amino-5-deoxy-β-D-allofuranosyluronic acid)-5-hydroxymethylcytosine;
1-(5-amino-5-deoxy-β-D-allofuranosyluronic acid)-5-nitrocytosine;
1-(5-amino-5-deoxy-β-D-allofuranosyluronic acid)-5-methylaminocytosine;
1-(5-amino-5-deoxy-β-D-allofuranosyluronic acid)-5-dimethylaminocytosine;
1-(5-amino-5-deoxy-β-D-allofuranosyluronic acid)-6-azacytosine;
1-(5-amino-5-deoxy-β-D-allofuranosyluronic acid)-6-aza-5-methylcytosine;
9-(5-amino-5-deoxy-β-D-allofuranosyluronic acid)-adenine;
9-(5-amino-5-deoxy-β-D-allofuranosyluronic acid)-2-fluoroadenine;
9-(5-amino-5-deoxy-β-D-allofuranosyluronic acid)-2-azaadenine;
9-(5-amino-5-deoxy-β-D-allofuranosyluronic acid)-6-methylaminopurine;
9-(5-amino-5-deoxy-β-D-allofuranosyluronic acid)-6-dimethylaminopurine;
9-(5-amino-5-deoxy-β-D-allofuranosyluronic acid)-7-deazaadenine;
9-(5-amino-5-deoxy-β-D-allofuranosyluronic acid)-8-azaadenine;
9-(5-amino-5-deoxy-β-D-allofuranosyluronic acid)-8-aza-9-deazaadenine;
9-(5-amino-5-deoxy-β-D-allofuranosyluronic acid)-hypoxanthine;
9-(5-amino-5-deoxy-β-D-allofuranosyluronic acid)-guanine;
9-(5-amino-5-deoxy-β-D-allofuranosyluronic acid)-8-azaguanine;
9-(5-amino-5-deoxy-β-D-allofuranosyluronic acid)-7-deazaguanine;
1-(5-amino-5-deoxy-α-L-talofuranosyluronic acid)-uracil;
1-(5-amino-5-deoxy-α-L-talofuranosyluronic acid)-5-fluorouracil;
1-(5-amino-5-deoxy-α-L-talofuranosyluronic acid)-5-chlorouracil;
1-(5-amino-5-deoxy-α-L-talofuranosyluronic acid)-5-bromouracil;
1-(5-amino-5-deoxy-α-L-talofuranosyluronic acid)-5-iodouracil;
1-(5-amino-5-deoxy-α-L-talofuranosyluronic acid)-5-methyluracil;
1-(5-amino-5-deoxy-α-L-talofuranosyluronic acid)-5-iso-propyluracil;
1-(5-amino-5-deoxy-α-L-talofuranosyluronic acid)-5-n-butyluracil;
1-(5-amino-5-deoxy-α-L-talofuranosyluronic acid)-5-trifluoromethyluracil;
1-(5-amino-5-deoxy-α-L-talofuranosyluronic acid)-5-hydroxymethyluracil;
1-(5-amino-5-deoxy-α-L-talofuranosyluronic acid)-5-nitrouracil;
1-(5-amino-5-deoxy-α-L-talofuranosyluronic acid)-5-methylaminouracil;
1-(5-amino-5-deoxy-α-L-talofuranosyluronic acid)-5-dimethylaminouracil;
1-(5-amino-5-deoxy-α-L-talofuranosyluronic acid)-6-azauracil;
1-(5-amino-5-deoxy-α-L-talofuranosyluronic acid)-6-aza-5-methyluracil;
1-(5-amino-5-deoxy-α-L-talofuranosyluronic acid)-cytosine;
1-(5-amino-5-deoxy-α-L-talofuranosyluronic acid)-5-fluorocytosine;
1-(5-amino-5-deoxy-α-L-talofuranosyluronic acid)-5-chlorocytosine;

1-(5-amino-5-deoxy-α-L-talofuranosyluronic acid)-5-bromocytosine;
1-(5-amino-5-deoxy-α-L-talofuranosyluronic acid)-5-iodocytosine;
1-(5-amino-5-deoxy-α-L-talofuranosyluronic acid)-5-methylcytosine;
1-(5-amino-5-deoxy-α-L-talofuranosyluronic acid)-5-iso-propylcytosine;
1-(5-amino-5-deoxy-α-L-talofuranosyluronic acid)-5-n-butylcytosine;
1-(5-amino-5-deoxy-α-L-talofuranosyluronic acid)-5-trifluoromethylcytosine;
1-(5-amino-5-deoxy-α-L-talofuranosyluronic acid)-5-nitrocytosine;
1-(5-amino-5-deoxy-α-L-talofuranosyluronic acid)-5-methylaminocytosine;
1-(5-amino-5-deoxy-α-L-talofuranosyluronic acid)-5-dimethylaminocytosine;
1-(5-amino-5-deoxy-α-L-talofuranosyluronic acid)-6-azacytosine;
1-(5-amino-5-deoxy-α-L-talofuranosyluronic acid)-6-aza-5-methylcytosine;
9-(5-amino-5-deoxy-α-L-talofuranosyluronic acid)-adenine;
9-(5-amino-5-deoxy-α-L-talofuranosyluronic acid)-2-fluoroadenine;
9-(5-amino-5-deoxy-α-L-talofuranosyluronic acid)-2-azaadenine;
9-(5-amino-5-deoxy-α-L-talofuranosyluronic acid)-6-methylaminopurine;
9-(5-amino-5-deoxy-α-L-talofuranosyluronic acid)-6-dimethylaminopurine;
9-(5-amino-5-deoxy-α-L-talofuranosyluronic acid)-7-deazaadenine;
9-(5-amino-5-deoxy-α-L-talofuranosyluronic acid)-8-azaadenine;
9-(5-amino-5-deoxy-α-L-talofuranosyluronic acid)-8-aza-9-deazaadenine;
9-(5-amino-5-deoxy-α-L-talofuranosyluronic acid)-hypoxanthine;
9-(5-amino-5-deoxy-α-L-talofuranosyluronic acid)-guanine;
9-(5-amino-5-deoxy-α-L-talofuranosyluronic acid)-8-azaguanine;
9-(5-amino-5-deoxy-α-L-talofuranosyluronic acid)-7-deazaguanine.

EXAMPLE 18

This example illustrates methods, according to our invention, of preparing the compounds of Formulas A′ and A″. In this example, a solution containing 13.6 g. of 2′,3′-O-cyclohexylideneuridine 5′-aldehyde hydrate in 100 ml. of methanol is cooled to 0° C. and then added with constant stirring to 120 ml. of ice cold aqueous solution containing 8 g. of sodium cyanide, 12 g. of potassium carbonate. The resulting reaction mixture is stirred at 0° C. for 15 minutes and then 52 ml. of aqueous 15% hydrogen peroxide is added and the resulting mixture is stirred at 0° C. for an additional 30 minutes. After this time the reaction mixture is adjusted to a pH of about 7 by the addition of aqueous 20% acetic acid, and then saturated with sodium chloride. The saturated solution is then extracted with 500 ml. of ethyl acetate, resulting in the formation of a crystalline material at the resulting interface. The crystalline material is removed by filtration and then further purified by recrystallization from aqueous ethanol affording 1-(2,3 - O - cyclohexylidene-α-L-talofuranosyluronamide)-uracil. The ethyl acetate phase was separated from the resulting filtrate and the aqueous phase further extracted with four 100 ml. portions of ethyl acetate. The ethyl acetate extracts were then combined with the extracted ethyl acetate phase and washed with aqueous sodium bicarbonate, then with aqueous sodium chloride solution and then dried over magnesium sulfate. The dried ethyl acetate extracts are then concentrated by vacuum evaporation affording a crystalline residue, which is determined by thin-layer chromatography to be an epimeric mixture of 1 - (2,3-O-cyclohexylidene-β-D-allofuranosyluronamide)-uracil and 1-(2,3 - O - cyclohexylidene-α-L-talofuranosyluronamide)-uracil, but is predominantly the D-allo epimer. The epimeric mixture is then resolved into the respective D-allo and -talo isomers by fractional crystallization from ethanol.

By following the same procedure as above, the products of Example 4 are converted into epimeric mixtures of the corresponding uronamide derivatives. In those cases where the purine or pyrimidine base is substituted with an N-benzoyl function, the crude uronamides are dissolved in a 1:1 mixture of methanol and concentrated ammonium hydroxide (25 ml. per gram of crude product) and stirred overnight at room temperature in order to effect deacylation. The solvent is then evaporated in vacuo and the mixtures of epimeric uronamides are resolved into their respective D-allo and L-talo isomers as above.

EXAMPLE 19

This example illustrates a method, according to our invention, for the preparation of β-D-allofuranosyluronamide and α-L-talofuranosyluronamide nucleosides (Formulas IIc and IId) of the present invention via removal of the 2′,3′-acetal protecting groups from the sugar and the N-acyl protecting group (if present) from the purine or pyrimidine base (e.g., Formulas A′ and A″). In this example, 2.5 g. of 1-(2,3-O-cyclohexylidene-β-D-allofuranosyluronamide) - $N^4$ - benzoylcytosine is dissolved in methanol (25 ml.) and concentrated ammonium hydroxide (25 ml.) is added. The resulting mixture is stirred at room temperature for 12 hours and then evaporated to dryness. Residual ammonia is then removed by co-evaporation with ethanol and the final residue is dissolved in 50 ml. of 80% acetic acid. This mixture is heated at 100° for 3 hours in order to remove the cyclohexylidene group, the progress of the reaction being readily followed by thin-layer chromatography using chloroform-methanol (9:1). After evaporation of the solvent the residue is dissolved in water and extracted with ether. The aqueous phase is then purified by chromatography on cellulose using butanol-acetic acid-water (5:2:3) giving 1-(β-D-allofuranosyluronamide) - cytosine which is crystallized from ethanol.

By following the same procedure as above, except that in those cases where N-acylated purine and pyrimidine bases are not present, the ammonium hydroxide hydrolysis is deleted, the other products of Example 18 are converted into the corresponding β-D-allofuranosyluronamide and α-L-talofuranosyluronamide nucleosides.

1-(β-D-allofuranosyluronamide) uracil;
1-(β-D-allofuranosyluronamide)-5-fluorouracil;
1-(β-D-allofuranosyluronamide)-5-chlorouracil;
1-(β-D-allofuranosyluronamide)-5-bromouracil;
1-(β-D-allofuranosyluronamide)-5-iodouracil;
1-(β-D-allofuranosyluronamide)-5-methyluracil;
1-(β-D-allofuranosyluronamide)-5-iso-propyluracil;
1-(β-D-allofuranosyluronamide)-5-n-butyluracil;
1-(β-D-allofuranosyluronamide)-5-trifluoromethyluracil;
1-(β-D-allofuranosyluronamide)-5-nitrouracil;
1-(β-D-allofuranosyluronamide)-5-methylaminouracil;
1-(β-D-allofuranosyluronamide)-5-dimethylaminouracil;
1-(β-D-allofuranosyluronamide)-6-azauracil;
1-(β-D-allofuranosyluronamide)-6-aza-5-methyluracil;
1-(β-D-allofuranosyluronamide)-5-fluorocytosine;
1-(β-Dallofuranosyluronamide)-5-chlorocytosine;
1-(β-D-allofuranosyluronamide)-5-bromocytosine;
1-(β-D-allofuranosyluronamide)-5-iodocytosine;
1-(β-D-allofuranosyluronamide)-5-methylcytosine;
1-(β-D-allofuranosyluronamide)-5-iso-propylcytosine;
1-(β-D-allofuranosyluronamide)-5-n-butylcytosine;
1-(β-D-allofuranosyluronamide)-5-trifluoromethylcytosine;

1-(β-D-allofuranosyluronamide)-5-nitrocytosine;
1-(β-D-allofuranosyluronamide)-5-methylaminocytosine;
1-(β-D-allofuranosyluronamide)-5-dimethylaminocytosine;
1-(β-D-allofuranosyluronamide)-6-azacytosine;
1-(β-D-allofuranosyluronamide)-6-aza-5-methylcytosine;
9-(β-D-allofuranosyluronamide)-adenine;
9-(β-D-allofuranosyluronamide)-2-fluoroadenine;
9-(β-D-allofuranosyluronamide)-2-azaadenine;
9-(β-D-allofuranosyluronamide)-6-methylaminopurine;
9-(β-D-allofuranosyluronamide)-6-dimethylaminopurine;
9-(β-D-allofuranosyluronamide)-7-deazaadenine;
9-(β-D-allofuranosyluronamide)-8-azaadenine;
9-(β-D-allofuranosyluronamide)-8-aza-9-deazaadenine;
9-(β-D-allofuranosyluronamide)-hypoxanthine;
9-(β-D-allofuranosyluronamide)-guanine;
9-(β-D-allofuranosyluronamide)-8-azaguanine;
9-(β-D-allofuranosyluronamide)-7-deazaguanine;
1-(α-L-talofuranosyluronamide)-uracil;
1-(α-L-talofuranosyluronamide)-5-fluorouracil;
1-(α-L-talofuranosyluronamide)-5-chlorouracil;
1-(α-L-talofuranosyluronamide)-5-bromouracil;
1-(α-L-talofuranosyluronamide)-5-iodouracil;
1-(α-L-talofuranosyluronamide)-5-methyluracil;
1-(α-L-talofuranosyluronamide)-5-iso-propyluracil;
1-(α-L-talofuranosyluronamide)-5-n-butyluracil;
1-(α-L-talofuranosyluronamide)-5-trifluoromethyluracil;
1-(α-L-talofuranosyluronamide)-5-nitrouracil;
1-(α-L-talofuranosyluronamide)-5-methylaminouracil;
1-(α-L-talofuranosyluronamide)-5-dimethylaminouracil;
1-(α-L-talofuranosyluronamide)-6-azauracil;
1-(α-L-talofuranosyluronamide)-6-aza-5-methyluracil;
1-(α-L-talofuranosyluronamide)-cytosine;
1-(α-L-talofuranosyluronamide)-5-fluorocytosine;
1-(α-L-talofuranosyluronamide)-5-chlorocytosine;
1-(α-L-talofuranosyluronamide)-5-bromocytosine;
1-(α-L-talofuranosyluronamide)-5-iodocytosine;
1-(α-L-talofuranosyluronamide)-5-methylcytosine;
1-(α-L-talofuranosyluronamide)-5-iso-propylcytosine;
1-(α-L-talofuranosyluronamide)-5-n-butylcytosine;
1-(α-L-talofuranosyluronamide)-5-trifluoromethylcytosine;
1-(α-L-talofuranosyluronamide)-5-nitrocytosine;
1-(α-L-talofuranosyluronamide)-5-methylaminocytosine;
1-(α-L-talofuranosyluronamide)-5-dimethylaminocytosine;
1-(α-L-talofuranosyluronamide)-6-azacytosine;
1-(α-L-talofuranosyluronamide)-6-aza-5-methylcytosine;
9-(α-L-talofuranosyluronamide)-adenine;
9-(α-L-talofuranosyluronamide)-2-fluoroadenine;
9-(α-L-talofuranosyluronamide)-2-azaadenine;
9-(α-L-talofuranosyluronamide)-6-methylaminopurine;
9-(α-L-talofuranosyluronamide)-6-dimethylaminopurine;
9-(α-L-talofuranosyluronamide)-7-deazaadenine;
9-(α-L-talofuranosyluronamide)-8-azaadenine;
9-(α-L-talofuranosyluronamide)-8-aza-9-deazaadenine;
9-(α-L-talofuranosyluronamide)-hypoxanthine;
9-(α-L-talofuranosyluronamide)-guanine;
9-(α-L-talofuranosyluronamide)-8-azaguanine;
9-(α-L-talofuranosyluronamide)-7-deazaguanine.

EXAMPLE 20

This example illustrates a method, according to our invention, by which the 1-(β-D-allofuranosyluronamide) and 1-(α-L-talofuranosyluronamide) derivatives of 5-benzyloxymethyluracil and 5-benzyloxymethylcytosine are converted into the corresponding hexofuranosyluronamide derivatives of 5-hydroxymethyluracil and 5-hydroxymethylcytosine (Formulas IIc and IId of our invention). In this example a solution of 1 g. of 1-(β-D-allofuranosyluronamide)-5-benzyloxymethyluracil in 25 ml. of methanol is vigorously stirred in an atmosphere of hydrogen in the presence of 200 mg. of a 10% palladium on barium sulface catalyst. After uptake of one molar equivalent of hydrogen, the mixture was filtered and the filtrate was evaporated to dryness giving essentially pure 1-(β-D-allofuranosyluronamide)-5-hydroxymethyluracil which is crystallized from ethanol.

By following the same procedure as above only starting with 1-(α-L-talofuranosyluronamide)-5-benzyloxymethyluracil and the 1-β-D-allo- and α-L-talo-furanosyluronamide derivatives of 5-benzyloxymethylcytosine, the corresponding nucleoside derivatives of 5-hydroxymethyluracil and 5-hydroxymethylcytosine are obtained.

EXAMPLE 21

This example illustrates methods, according to our invention, of preparing 5'-O-methanesulfonyl-α-L-talofuranosyluronamide derivatives (of Formula B'). In this example, 1.81 g. of methanesulfonyl chloride is added to a mixture containing 4.29 g. (11.7 mmoles) of 1-(2,3-O-cyclohexylidene-α-L-talofuranosyluronamide) - uracil in 100 ml. of pyridine at 4° C. The mixture is maintained at 4° C. for 24 hours, and then examined by thin-layer chromatography. If unreacted starting material is still present, a further 0.6 gram of methanesulfonyl chloride is then added and the resulting mixture maintained at room temperature for 2 hours. Five ml. of water is then added and the resulting mixture then concentrated by vacuum evaporation. The resulting residue is treated with 200 ml. of water and 200 ml. of chloroform and then filtered to remove insoluble material. The insoluble material is determined to be 1-(2,3-O-cyclohexylidene-5-O-methanesulfonyl-α-L-talofuranosyluronamide)-uracil. The chloroform layer is removed from the filtrate and the remaining aqueous layer further extracted with three 100 ml. portions of chloroform. The chloroform extracts are combined, then washed with water, dried over magnesium sulfate and concentrated by vacuum evaporation affording a further residue of 1-(2,3,-O-cyclohexylidene-5-O-methanesulfonyl-α-L-talofuranosyluronamide)-uracil. The two crude products are then combined and further purified by recrystallization from acetone-methanol.

By following the same procedure as above, the remaining α-L-talofuranosyluronamide of Example 18 are converted to the corresponding 5-O-methanesulfonyl derivatives.

EXAMPLE 21a

This example illustrates methods, according to our invention, of preparing 5'-O-methanesulfonyl-β-D-allofuranosyluronamide derivatives (of Formula B"). In this example, 3.20 g. (7 mmoles) of 1-(2,3-O-cyclohexylidene-β-D-allofuranosyluronamide)-uracil is dissolved in 50 ml. of anhydrous pyridine. The resulting solution is then evaporated to dryness under vacuum. The dissolution in pyridine and evaporation purification procedure is repeated two additional times, and the resulting residue then dissolved in 75 ml. of dry pyridine. 0.88 gram (7.7 mmoles) of methanesulfonyl chloride is then added to the solution at 4° C. and the resulting mixture then maintained at 4° C. for 20 hours with constant stirring, after which time an additional 0.22 g. of methanesulfonyl chloride is added. The resulting mixture is then maintained at room temperature (about 20° C.), for an additional two hours and 5 ml. of water is then added. The reaction mixture is then concentrated by vacuum evaporation and the resulting residue partitioned between 100 ml. of water and 100 ml. of chloroform. The aqueous phase is then further extracted with four 100 ml. portions of chloroform and the resulting extracts combined with the original chloroform phase and washed with water, dried over magnesium sulfate, and then evaporated to dryness. The resulting residue is chromatographed over silica gel eluting first with chloroform, then with 5% (by vol.) methanol in chloroform, and then with 10% (by vol.) methanol in chloroform. The major peak is concentrated affording 1 - (2,3 - O - cyclohexylidene-5-O-methanesulfonyl-β-D-allofuranosyluronamide)-uracil.

By following the same procedure as above, the remaining β-D-allofuranosyluronamide isomers of Example 18 are respectively converted to the corresponding 5'-O-methanesulfonyl-β-D-allofuranosyluronamide derivatives.

EXAMPLE 22

This example illustrates method, according to our invention, of preparing 5'-azido-β-D-allofuranosyluronamide nucleoside derivatives (Formula C'). In this example, 2.54 g. (37 mmoles) of sodium azide is added to a mixture containing 3.92 g. (8 mmoles) of 1-(2,3-O-cyclohexylidene-5-O-methanesulfonyl - α - L - talofuranosyluronamide)-uracil in 200 ml. of dimethylformamide at 60° C. The mixture is maintained at 60° C. for 6 hours with constant stirring, and then concentrated by vacuum evaporation. The resulting residue is partitioned between 100 ml. of water and 100 ml. of chloroform. The aqueous phase is then further extracted three times with 100 ml. portions of chloroform. The chloroform phase and the chloroform extracts are combined and then washed with water, dried over magnesium sulfate and then vacuum evaporated to dryness affording a residue, which is chromatographed over a silica gel column successively eluting with chloroform, 2% (by vol.) methanol in chloroform, and then 10% (by vol.) methanol in chloroform. The major peak is concentrated affording chromatographically pure 1-(5-azido-2,3-O-cyclohexylidene-5-deoxy-β-D-allofuranosyluronamide)-uracil.

By following the same procedure as above, the remaining 5'-O-methanesulfonyl-α-L-talofuranosyluronamide derivatives of Example 21 are respectively converted into the corresponding 5'-azido-5-deoxy-β-D-allofuranosyluronamide nucleoside derivatives.

EXAMPLE 22a

This example illustrates methods, according to our invention, of preparing 5-azido-5-deoxy-α-L-talofuranosyluronamide nucleoside derivatives (Formula C"). In this example, 1.88 g. (29 mmoles) of sodium azide is added to a mixture of 2.90 g. (6.5 mmoles) of 1-(2,3-O-cyclohexylidene - 5 - O - methanesulfonyl-β-D-allofuranosyluronamide)-uracil in 150 ml. of dimethylformamide at 60° C. The resulting mixture is maintained at 60° C. for 6½ hours with constant stirring, and then vacuum evaporated to dryness. The resulting residue is then partitioned between 100 ml. of water and 100 ml. of chloroform and the resulting aqueous phase is extracted three times with 100 ml. portions of chloroform. The initial chloroform phase and the chloroform extracts are combined and then dried over magnesium sulfate and then evaporated to dryness. The resulting residue is chromatographed over a silica gel column eluting successively with chloroform, 2% (by vol.) methanol in chloroform, and 5% (by vol.) methanol in chloroform. The major peak is concentrated affording chromatographically pure 1-(5-azido-2,3-O-cyclohexyliden - 5 - deoxy-α-L-talofuranosyluronamide)-uracil.

By following the same procdure as above, the remaining 5'-O-methanesulfonyl-β-D-allofuranosyluronamide derivatives of Example 21a are respectively converted to the corresponding 5-azido-5-deoxy-α-L-talofuranosyluronamide nucleoside derivatives.

EXAMPLE 23

This example illustrates a method, according to our invention, of preparing 5-amino-5-deoxy-β-D-allofuranosyluronamide and 5-amino-5-deoxy-α-L-talofuranosyluronamide nucleosides of Formulas IIa and IIb from the compounds of Formulas C' and C". In this example 2.2 g. of 1-(5-azido-2,3-O-cyclohexylidene-5-deoxy-β-D - allofuranosyluronamide)-uracil is dissolved in 25 ml. of 80% acetic acid and heated for 3 hours at 100° in order to hydrolyze the cyclohexylidene protecting group. This process can be readily followed by thin-layer chromatography using chloroform-methanol (9:1). The solvent is then evaporated in vacuo and the residue is triturated with hexane to remove cyclohexanone. The final residue is dissolved in methanol (50 ml.) and vigorously stirred in an atmosphere of hydrogen with 100 mg. of 10% palladium on barium sulfate catalyst for 3 hours. The catalyst is removed by filtration and washed with water and the combined filtrates and washings are evaporated to dryness. The residue is purified by preparative thin-layer chromatography on six 20 x 100 cm. plates coated with a 1.5 mm. layer of microcrystalline cellulose (Avicel) using butanol-acetic acid-water (5:2:3) as solvent.

The major Ninhydrin and periodate positive band is eluted with methanol and soluble impurities from the cellulose plate are removed by absorbing the product on a 1 x 10 cm. column of Dowex 50 (H+) resin. The column is washed with water and then eluted with 2 M ammonium hydroxide. Evaporation of the solvent then gives 1-(5-amino-5-deoxy-β-D-allofuranosyluronamide) - uracil as a homogeneous foam.

By following the same procedure as above using the products of Examples 22 and 22a as starting materials, the corresponding 5-amino-5-deoxy-β-D-allofuranosyluronamide and 5-amino-5-deoxy-α-L - talofuranosyluronamide nucleosides listed below are prepared. (In the case of the compounds derived from the 5-nitro-5-iodo- and 5-bromo-derivatives of uracil and cytosine, the alternative reductive method described in Example 11a using sodium borohydride is used to minimize concomitant reduction of these base substituents and thus simplify the isolation procedure.)

1-(5-amino-5-deoxy-β-D-allofuranosyluronamide)-5-fluorouracil;
1-(5-amino-5-deoxy-β-D-allofuranosyluronamide)-5-chlorouracil;
1-(5-amino-5-deoxy-β-D-allofuranosyluronamide)-5-bromouracil;
1-(5-amino-5-deoxy-β-D-allofuranosyluronamide)-5-iodouracil;
1-(5-amino-5-deoxy-β-D-allofuranosyluronamide)-5-methyluracil;
1-(5-amino-5-deoxy-β-D-allofuranosyluronamide)-5-isopropyluracil;
1-(5-amino-5-deoxy-β-D-allofuranosyluronamide)-5-n-butyluracil;
1-(5-amino-5-deoxy-β-D-allofuranosyluronamide)-5-trifluoromethyluracil;
1-(5-amino-5-deoxy-β-D-allofuranosyluronamide)-5-hydroxymethyluracil;
1-(5-amino-5-deoxy-β-D-allofuranosyluronamide)-5-nitrouracil;
1-(5-amino-5-deoxy-β-D-allofuranosyluronamide)-5-methylaminouracil;
1-(5-amino-5-deoxy-β-D-allofuranosyluronamide)-5-dimethylaminouracil;
1-(5-amino-5-deoxy-β-D-allofuranosyluronamide)-6-azauracil;
1-(5-amino-5-deoxy-β-D-allofuranosyluronamide)-6-aza-5-methyluracil;
1-(5-amino-5-deoxy-β-D-allofuranosyluronamide)-cytosine;
1-(5-amino-5-deoxy-β-D-allofuranosyluronamide)-5-fluorocytosine;
1-(5-amino-5-deoxy-β-D-allofuranosyluronamide)-5-chlorocytosine;
1-(5-amino-5-deoxy-β-D-allofuranosyluronamide)-5-bromocytosine;
1-(5-amino-5-deoxy-β-D-allofuranosyluronamide)-5-iodocytosine;
1-(5-amino-5-deoxy-β-D-allofuranosyluronamide)-5-methylcytosine;

1-(5-amino-5-deoxy-β-D-allofuranosyluronamide)-5-isopropylcytosine;
1-(5-amino-5-deoxy-β-D-allofuranosyluronamide)-5-n-butylcytosine;
1-(5-amino-5-deoxy-β-D-allofuranosyluronamide)-5-trifluoromethylcytosine;
1-(5-amino-5-deoxy-β-D-allofuranosyluronamide)-5-hydroxymethylcytosine;
1-(5-amino-5-deoxy-β-D-allofuranosyluronamide)-5-nitrocytosine;
1-(5-amino-5-deoxy-β-D-allofuranosyluronamide)-5-methylaminocytosine;
1-(5-amino-5-deoxy-β-D-allofuranosyluronamide)-5-dimethylaminocytosine;
1-(5-amino-5-deoxy-β-D-allofuranosyluronamide)-6-azacytosine;
1-(5-amino-5-deoxy-β-D-allofuranosyluronamide)-6-aza-5-methylcytosine;
9-(5-amino-5-deoxy-β-D-allofuranosyluronamide)-adenine;
9-(5-amino-5-deoxy-β-D-allofuranosyluronamide)-2-fluoroadenine;
9-(5-amino-5-deoxy-β-D-allofuranosyluronamide)-2-azaadenine;
9-(5-amino-5-deoxy-β-D-allofuranosyluronamide)-6-methylaminopurine;
9-'5-amino-5-deoxy-β-D-allofuranosyluronamide)-6-dimethylaminopurine;
9-(5-amino-5-deoxy-β-D-allofuranosyluronamide)-7-deazaadeine;
9-(5-amino-5-deoxy-β-D-allofuranosyluronamide)-8-azaadenine;
9-(5-amino-5-deoxy-β-D-allofuranosyluronamide)-8-aza-9-deazaadenine;
9-(5-amino-5-deoxy-β-D-allofuranosyluronamide)-hypoxanthine;
9-(5-amino-5-deoxy-β-D-allofuranosyluronamide)-guanine;
9-(5-amino-5-deoxy-β-D-allofuranosyluronamide)-8-azaguanine;
9-(5-amino-5-deoxy-β-D-allofuranosyluronamide)-7-deazaguanine;
1-(5-amino-5-deoxy-α-L-talofuranosyluronamide)-uracil;
1-(5-amino-5-deoxy-α-L-talofuranosyluronamide)-5-fluorouracil;
1-(5-amino-5-deoxy-α-L-talofuranosyluronamide)-5-chlorouracil;
1-(5-amino-5-deoxy-α-L-talofuranosyluronamide)-5-bromouracil;
1-(5-amino-5-deoxy-α-L-talofuranosyluronamide)-5-iodouracil;
1-(5-amino-5-deoxy-α-L-talofuranosyluronamide)-5-methyluracil;
1-(5-amino-5-deoxy-α-L-talofuranosyluronamide)-5-isopropyluracil;
1-(5-amino-5-deoxy-α-L-talofuranosyluronamide)-5-n-butyluracil;
1-(5-amino-5-deoxy-α-L-talofuranosyluronamide)-5-trifluoromethyluracil;
1-(5-amino-5-deoxy-α-L-talofuranosyluronamide)-5-hydroxymethyluracil;
1-(5-amino-5-deoxy-α-L-talofuranosyluronamide)-5-nitrouracil;
1-(5-amino-5-deoxy-α-L-talofuranosyluronamide)-5-methylaminouracil;
1-(5-amino-5-deoxy-α-L-talofuranosyluronamide)-5-dimethylaminouracil;
1-(5-amino-5-deoxy-α-L-talofuranosyluronamide)-6-azauracil;
1-(5-amino-5-deoxy-α-L-talofuranosyluronamide)-6-aza-5-methyluracil;
1-(5-amino-5-deoxy-α-L-talofuranosyluronamide)-cytosine;
1-(5-amino-5-deoxy-α-L-talofuranosyluronamide)-5-fluorocytosine;
1-(5-amino-5-deoxy-α-L-talofuranosyluronamide)-5-chlorocytosine;
1-(5-amino-5-deoxy-α-L-talofuranosyluronamide)-5-bromocytosine;
1-(5-amino-5-deoxy-α-L-talofuranosyluronamide)-5-iodocytosine;
1-(5-amino-5-deoxy-α-L-talofuranosyluronamide)-5-methylcytosine;
1-(5-amino-5-deoxy-α-L-talofuranosyluronamide)-5-isopropylcytosine;
1-(5-amino-5-deoxy-α-L-talofuranosyluronamide)-5-n-butylcytosine;
1-(5-amino-5-deoxy-α-L-talofuranosyluronamide)-5-trifluoromethylcytosine;
1-(5-amino-5-deoxy-α-L-talofuranosyluronamide)-5-hydroxymethylcytosine;
1-(5-amino-5-deoxy-α-L-talofuranosyluronamide)-5-nitrocytosine;
1-(5-amino-5-deoxy-α-L-talofuranosyluronamide)-5-methylaminocytosine;
1-(5-amino-5-deoxy-α-L-talofuranosyluronamide)-5-dimethylaminocytosine;
1-(5-amino-5-deoxy-α-L-talofuranosyluronamide)-6-azacytosine;
1-(5-amino-5-deoxy-α-L-talofuranosyluronamide)-6-aza-5-methylcytosine;
9-(5-amino-5-deoxy-α-L-talofuranosyluronamide)-adenine;
9-(5-amino-5-deoxy-α-L-talofuranosyluronamide)-2-fluoroadenine;
9-(5-amino-5-deoxy-α-L-talofuranosyluronamide)-2-azaadenine;
9-(5-amino-5-deoxy-α-L-talofuranosyluronamide)-6-methylaminopurine;
9-(5-amino-5-deoxy-α-L-talofuranosyluronamide)-6-dimethylaminopurine;
9-(5-amino-5-deoxy-α-L-talofuranosyluronamide)-7-deazaadenine;
9-(5-amino-5-deoxy-α-L-talofuranosyluronamide)-8-aza-adenine;
9-(5-amino-5-deoxy-α-L-talofuranosyluronamide)-8-aza-9-deazaadenine;
9-(5-amino-5-deoxy-α-L-talofuranosyluronamide)-hypoxanthine;
9-(5-amino-5-deoxy-α-L-talofuranosyluronamide)-guanine;
9-(5-amino-5-deoxy-α-L-talofuranosyluronamide)-8-aza-guanine.

EXAMPLE 24

This example illustrates methods, according to our invention, of preparing 1-(5-azido-5-deoxy-β-D-allofuranosyluronic acid)-uracil derivatives (Formula D'). In this example, 13.5 g. of a sulfonated polystyrene ion exchange resin in the H+ form (sold under the trademark Dowex 50 (H+)) is added to a mixture containing 1.176 g. (3 mmoles) of 1-(5-azido-2,3-O-cyclohexylidene-5-deoxy-β-D-allofuranosyluronamide)-uracil in a mixture of 45 ml. of dioxane and 90 ml. of water. The resulting suspension is vigorously stirred and heated at 90° C. for 18 hours, after which time the resin is removed by filtration and washed carefully with water. The filtrates are combined and then diluted with water to a volume of 250 ml. The solution is adjusted to pH 7, by the addition of aqueous ammonium hydroxide, and then chromatographed over a column of a quaternary ammonium ion exchange resin in the acetate form (preferably Bio Rad AG 1 x 8). The column is then successively washed with 1250 ml. of water, then 5,000 ml. of aqueous 0.2 N triethylammonium bicarbonate solution, then 2,000 ml. of aqueous 0.3 N triethylammonium bicarbonate solution. The major peak fractions are concentrated affording the triethyl-ammonium salt of 1-(5-azido-5-deoxy-β-D-allofuranosyluronic acid)-uracil, which is then converted to the free acid, i.e., 1 - (5-azido-5-deoxy-β-D-allofuranosyluronic acid)-uracil by passage through a column of H+ ion exchange resin (e.g., Dowex 50 (H+)). The free acid product is then further converted to a dry white powder by trituration with ether.

By following the same procedure as above, the remaining 1-(5-azido - 5 - deoxy-β-D-allofuranosyluronamide)-uracil derivatives of Example 22 are respectively converted to the corresponding 1-(5-azido-5-deoxy-β-D-allofuranosyluronic acid)-uracil derivatives.

EXAMPLE 24a

This example illustrates methods according to our invention, of preparing 1-(5-azido-5-deoxy-α-L-talofuranosyl-uronic acid)-uracil derivatives (Formula D''). In this example 8.7 g. of a dry sulfonate polystyrene ion exchange resin in the H+ form (Dowex 50 (H+)) is added to a mixture containing 760 mg. of 1-(5-azido-2,3-O-cyclohexylidene - 5 - deoxy-α-L-talofuranosyluronamide)-uracil in 20 ml. of ethanol and 50 ml. of water. The resulting suspension is stirred vigorously at 100° C. for 20 hours after which time the resin is removed by filtration. The filtrates are combined and then diluted with water to a volume of 250 ml. and then adjusted to a pH of 7 by the addition of aqueous ammonium hydroxide. The solution is then chromatographed over a column of a quaternary ammonium ion exchange resin in the acetate form (e.g., Bio Rad AG 1 x 8). The column is then successively washed with 1,000 ml. of water and then 2,000 ml. of aqueous 0.3 N triethylammonium bicarbonate solution. The major peak fractions are pooled and evaporated to dryness giving a residue that is then dissolved in water and passed through a H+ ion exchange resin (e.g., Dowex 50 (H+)). The ion exchange resin is then washed with 500 ml. of water and the combined eluates are then evaporated to dryness and the resulting residue crystallized from iso-propanol affording 1-(5-azido-5-deoxy-α-L-talofuranosyluronic acid)-uracil.

By following the same procedure as above, the remaining 1-(5-azido-5-deoxy-α-L-talofuranosyluronamide)-uracil derivatives of Example 22a are respectively converted into the corresponding 5'-azido-5'-deoxy-α-L-talofuranosyluronic acid derivatives.

EXAMPLE 25

This example illustrates methods, according to our invention, of preparing the 1-(5-amino-5-deoxy-β-D-allofuranosyluronic acid)-uracil derivatives of Formula Ic of our invention. In this example, 313 mg. (1 mmole) of 1-(5-azido-5-deoxy-β-D-allofuranosyluronic acid)-uracil and 100 mg. of 5% palladium on barium sulfate catalyst are added to 15 ml. of water and the resulting mixture is then hydrogenated at room temperature under one atmosphere of hydrogen for one hour. The catalyst is then removed by filtration and the resulting filtrate evaporated to dryness. The resulting residue is then crystallized from aqueous ethanol affording 1-(5-amino-5-deoxy-β-D-allofuranosyluronic acid)-uracil. Additional 1-(5-amino-5-deoxy-β-D-allofuranosyluronic acid)-uracil is recovered by preparative paper chromatography of the aqueous ethanol mother liquors using a butanol-acetic acid-water (5:2:3) as solvent.

By following the same procedure as above using the corresponding 1-(5-azido - 5 - deoxy-β-D-allofuranosyluronic acid)-uracil derivatives of Example 24 as starting material, the following compounds of Formula Ic are prepared.

1-(5-amino-5-deoxy-β-D-allofuranosyluronic acid)-5-fluorouracil;
1-(5-amino-5-deoxy-β-D-allofuranosyluronic acid)-5-chlorouracil;
1-(5-amino-5-deoxy-β-D-allofuranosyluronic acid)-5-bromouracil;
1-(5-amino-5-deoxy-β-D-allofuranosyluronic acid)-5-iodouracil;
1-(5-amino-5-deoxy-β-D-allofuranosyluronic acid)-5-methyluracil;
1-(5-amino-5-deoxy-β-D-allofuranosyluronic acid)-5-isopropyluracil;
1-(5-amino-5-deoxy-β-D-allofuranosyluronic acid)-5-n-butyluracil;
1-(5-amino-5-deoxy-β-D-allofuranosyluronic acid)-5-trifluoromethyluracil;
1-(5-amino-5-deoxy-β-D-allofuranosyluronic acid)-5-hydroxymethyluracil;
1-(5-amino-5-deoxy-β-D-allofuranosyluronic acid)-5-nitrouracil;
1-(5-amino-5-deoxy-β-D-allofuranosyluronic acid)-5-methylaminouracil;
1-(5-amino-5-deoxy-β-D-allofuranosyluronic acid)-5-dimethylaminouracil;
1-(5-amino-5-deoxy-β-D-allofuranosyluronic acid)-6-azauracil;
1-(5-amino-5-deoxy-β-D-allofuranosyluronic acid)-6-aza-5-methyluracil.

In the case of the derivatives of 5-nitrouracil, 5-iodouracil and 5-bromouracil, the reduction can be alternatively and advantageous carried out by treatment of the azido compound with sodium borohydride in a mixture of dimethylformamide and methanol as in Example 11a. In the present case, the reaction is best worked up by dilution with water, acidification, adsorption of the nucleosides on activated charcoal and elution with 2% ammonium hydroxide in 50% aqueous ethanol. The amino acid nucleosides are then further purified by preparative thin-layer chromatography on microcrystalline cellulose using butanol-acetic acid-water (5:2:3).

EXAMPLE 25a

This example illustrates methods, according to our invention, of preparing the 1-(5-amino-5-deoxy-α-L-talofuranosyluronic acid)-uracil derivatives of Formula Id of our invention. In this example 65 mg. (0.21 mmole) of 1-(5 - azido-5-deoxy-α-L-talofuranosyluronic acid)-uracil and 20 mg. of 5% palladium-barium sulfate catalyst are added to 30 ml. of water and then hydrogenated at room temperature (about 20° C.) for two hours under one atmosphere of hydrogen. The catalyst is then removed by filtration and the resulting filtrate evaporated to dryness by vacuum evaporation. The resulting residue is recrystallized from aqueous ethanol affording 1-(5-amino-5-deoxy-α-L-talofuranosyluronic acid)-uracil. By following the same procedure as above, the corresponding 1-(5-azido-5-deoxy-α-L-talofuranosyluronic acid)-uracil derivatives of Example 24a are respectively converted into the following compounds:

1-(5-amino-5-deoxy-α-L-talofuranosyluronic acid)-5-fluorouracil;
1-(5-amino-5-deoxy-α-L-talofuranosyluronic acid)-5-chlorouracil;
1-(5-amino-5-deoxy-α-L-talofuranosyluronic acid)-5-bromouracil;
1-(5-amino-5-deoxy-α-L-talofuranosyluronic acid)-5-iodouracil;
1-(5-amino-5-deoxy-α-L-talofuranosyluronic acid)-5-methyluracil;
1-(5-amino-5-deoxy-α-L-talofuranosyluronic acid)-5-isopropyluracil;
1-(5-amino-5-deoxy-α-L-talofuranosyluronic acid)-5-n-butyluracil;
1-(5-amino-5-deoxy-α-L-talofuranosyluronic acid)-5-trifluoromethyluracil;
1-(5-amino-5-deoxy-α-L-talofuranosyluronic acid)-5-hydroxymethyluracil;
1-(5-amino-5-deoxy-α-L-talofuranosyluronic acid)-5-nitrouracil;
1-(5-amino-5-deoxy-α-L-talofuranosyluronic acid)-5-methylaminouracil;

41

1-(5-amino-5-deoxy-α-L-talofuranosyluronic acid)-5-dimethylaminouracil;

1-(5-amino-5-deoxy-β-L-talofuranosyluronic acid)-6-azauracil;

1-(5-amino-5-deoxy-β-L-talofuranosyluronic acid)-6-aza-5-methyluracil.

In the case of the derivatives of 5-nitrouracil, 5-iodouracil and 5-bromouracil, the reduction can be alternatively and advantageously carried out by treatment of the azido compound with sodium borohydride in a mixture of dimethylformamide and methanol as in Example 11a. In the present case, the reaction is best worked up by dilution with water, acidification, adsorption of the nucleosides on activated charcoal and elution with 2% ammonium hydroxide in 50% aqueous ethanol. The amino acid nucleosides are then further purified by preparative thin-layer chromatography on microcrystalline cellulose using butanol-acetic acid-water (5:2:3).

EXAMPLE 26

This example illustrates a method, according to our invention, for converting 5′-amino-cytosine nucleosides of our invention into the corresponding $N^4$-hydroxycytosine nucleosides of our invention. In this example a solution of 200 mg. of 1-(5-amino-5-deoxy-β-D-allofuranosyluronic acid)-cytosine and 100 mg. of hydroxylamine hydrochloride in 1.0 ml. of water is kept at room temperature for seven days. The mixture is then diluted with water, adjusted to pH 3 with hydrochloric acid and stirred for 30 minutes with 10 g. of activated charcoal. The charcoal is then removed by filtration, washed thoroughly with water, and then eluted with 2% concentrated ammonium hydroxide in 50% aqueous ethanol until all nucleosidic material is removed. Evaporation of the eluates leaves 1-(5-amino-5-deoxy-β-D-allofuranosyluronic acid)-$N^4$-hydroxycytosine which is further purified by preparative thin-layer chromatography on microcrystalline cellulose using butanol-acetic acid-water (5:2:3) as eluant.

By following the same procedure but using as starting materials 1-(5-amino-5-deoxy-α-L-talofuranosyluronic acid)-cytosine,
1-(5-amino-5-deoxy-β-D-allofuranosyluronamide)-cytosine,
1-(5-amino-5-deoxy-α-L-talofuranosyluronamide)-cytosine,
1-(5-amino-5-deoxy-β-D-allofuranosyl)-cytosine,
1-(5-amino-5-deoxy-α-L-talofuranosyl)cytosine,
1-(β-D-allofuranosyluronamide)-cytosine, and
1-(α-L-talofuranosyluronamide)-cytosine the corresponding $N^4$-hydroxycytosine nucleosides are respectively prepared.

Obviously many modifications and variations of the invention described herein above, and below, can be made without departing from the essence and scope thereof.

What is claimed is:

1. A compound having the formulas

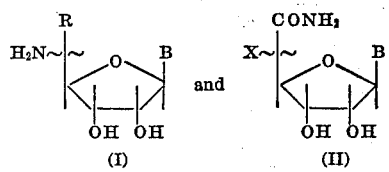

wherein
R is selected from the group consisting of —CH$_2$OH and —COOH; X is selected from the group consisting of —OH and —NH$_2$; the wavy line at the 5′-position indicates both the β-D-allo and α-L-talo

42 epimers; and B is selected from the group consisting of a pyrimidine base having the formulas:

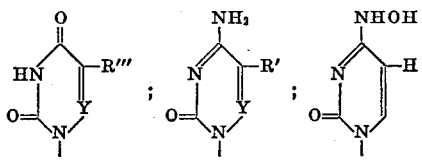

wherein
R′ and R′′′ are independently selected from the group consisting of H, fluoro, chloro, bromo, iodo, lower alkyl having from 1 through 7 carbon atoms, trifluoromethyl, hydroxymethyl, nitro, methylamino, and dimethylamino, and Y is selected from the group consisting of CH and N, and wherein when Y is N, R′ and R′′′ are independently selected from the group consisting of H and methyl; and wherein when Formula I has the β-D-allo configuration and where R is —COOH then R′′′ is selected from the group consisting of fluoro, chloro, bromo, iodo, lower alkyls having 2 through 7 carbon atoms, trifluoromethyl, nitro, methylamino, and dimethylamino;
and a purine base selected from the group consisting of adenin-9-yl, 2-fluoroadenin-9-yl, 2-azaadenin-9-yl, 6-methylaminopurin-9-yl, 6-dimethylaminopurin-9-yl, 7-deazaadenin-9-yl, 8-azaadenin-9-yl, 8-aza-9-deazaadenin-9-yl, guanin-9-yl, 8-azaguanin-9-yl, 7-deazaguanin-9-yl, and hypoxanthin-9-yl,
and pharmaceutically acceptable salts thereof.

2. The compound of claim 1 wherein said compound is selected from the group having the formula

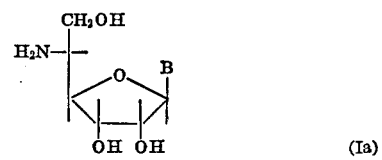

wherein B has the same meaning as in claim 1; and pharmaceutically acceptable salts thereof.

3. The compound of claim 2 wherein B is a pyrimidine base selected from the group consisting of uracil-1-yl, 5-methyluracil-1-yl, 5-hydroxymethyluracil-1-yl, 5-fluorouracil-1-yl, cytosin-1-yl, 5-methylcytosin-1-yl, 5-hydroxymethylcytosin-1-yl, and 5-fluorocytosin-1-yl.

4. The compound of claim 2 wherein B is a purine base selected from the group consisting of adenin-9-yl, guanin-9-yl, and 2-azaadenin-9-yl and 8-aza-9-deazaadenin-9-yl.

5. The compound of claim 1 wherein said compound is selected from the group having the formula

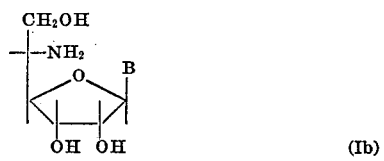

wherein B is as defined in claim 1; and pharmaceutically acceptable salts thereof.

6. The compound of claim 5 wherein B is a pyrimidine base selected from the group consisting of uracil-1-yl, 5-methyluracil-1-yl, 5-hydroxymethyluracil - 1 - yl, 5-fluorouracil-1-yl, cytosin-1-yl, 5-methylcytosin-1-yl, 5-hydroxymethylcytosin-1-yl, and 5-fluorocytosin-1-yl.

7. The compound of claim 5 wherein B is a purine base selected from the group consisting of adenin-9-yl, guanin-9-yl, and 2-azaadenin-9-yl and 8-aza-9-deazaadenin-9-yl.

8. The compound of claim 1 wherein said compound is selected from the group having the formula

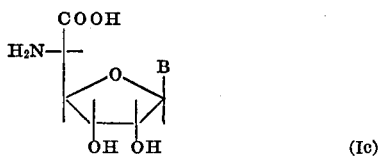
(Ic)

wherein B is as defined in claim 1; and pharmaceutically acceptable salts thereof.

9. The compound of claim 8 wherein B is a pyrimidine base selected from the group consisting of 5-fluorouracil-1-yl, cytosin-1-yl, 5-methylcytosin-1-yl, 5-hydroxymethylcytosin-1-yl, and 5-fluorocytosin-1-yl.

10. The compound of claim 8 wherein B is a purine base selected from the group consisting of adenin-9-yl, guanin-9-yl, 2-azaadenin-9-yl and 8-aza-9-deazaadenin-9-yl.

11. The compound of claim 1 wherein said compound is selected from the group having the formula

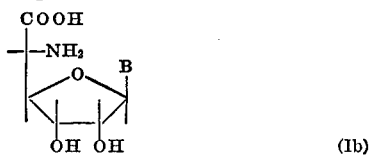
(Ib)

wherein B is as defined in claim 1; and pharmaceutically acceptable salts thereof.

12. The compound of claim 11 wherein B is a pyrimidine base selected from the group consisting of uracil-1-yl, 5-methyluracil-1-yl, 5-hydroxymethyluracil-1-yl, 5-fluorouracil-1-yl, cytosin-1-yl, 5-methylcytosin-1-yl, 5-hydroxymethylcytosin-1-yl, and 5-fluorocytosin-1-yl.

13. The compound of claim 11 wherein B is a purine base selected from the group consisting of adenin-9-yl, guanin-9-yl, 2-azaadenin-9-yl, and 8-aza-9-deazaadenin-9-yl.

14. The compound of claim 1 wherein said compound is selected from the group having the formula

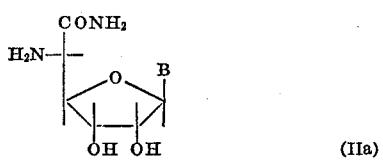
(IIa)

wherein B has the same meaning as set forth in claim 1; and pharmaceutically acceptable salts thereof.

15. The compound of claim 14 wherein B is a pyrimidine base selected from the group consisting of uracil-1-yl, 5-methyluracil-1-yl, 5-hydroxymethyluracil-1-yl, 5-fluorouracil-1-yl, cytosin-1-yl, 5-methylcytosin-1-yl, 5-hydroxymethylcytosin-1-yl, and 5-fluorocytosin-1-yl.

16. The compound of claim 14 wherein B is a purine base selected from the group consisting of adenin-9-yl, guanin-9-yl, 2-azaadenin-9-yl and 8-aza-9-deazaadenin-9-yl.

17. The compound of claim 1 wherein said compound is selected from the group having the formula

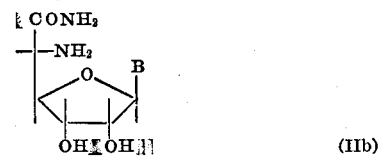
(IIb)

wherein B has the same meaning as set forth in claim 1; and pharmaceutically acceptable salts thereof.

18. The compound of claim 17 wherein B is a pyrimidine base selected from the group consisting of uracil-1-yl, 5-methyluracil-1-yl, 5-hydroxymethyluracil-1-yl, 5-fluorouracil-1-yl, cytosin-1-yl, 5-methylcytosin-1-yl, 5-hydroxymethylcytosin-1-yl, and 5-fluorocytosin-1-yl.

19. The compound of claim 17 wherein B is a purine base selected from the group consisting of adenin-9-yl, guanin-9-yl, 2-azaadenin-9-yl and 8-aza-9-deazaadenin-9-yl.

20. The compound of claim 1 having the formula

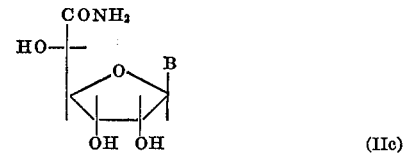
(IIc)

wherein B is as defined in claim 1.

21. The compound of claim 20 wherein B is a pyrimidine base selected from the group consisting of uracil-1-yl, 5-methyluracil-1-yl, 5-hydroxymethyluracil-1-yl, 5-fluorouracil-1-yl, cytosin-1-yl, 5-methylcytosin-1-yl, 5-hydroxymethylcytosin-1-yl, and 5-fluorocytosin-1-yl.

22. The compound of claim 20 wherein B is a purine base selected from the group consisting of adenin-9-yl, guanin-9-yl, 2-azaadenin-9-yl and 8-aza-9-deazaadenin-9-yl.

23. The compound of claim 1 having the formula

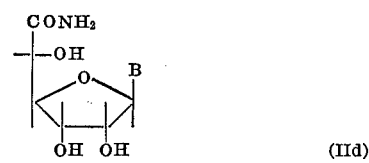
(IId)

wherein B is as defined in claim 1.

24. The compound of claim 23 wherein B is a pyrimidine base selected from the group consisting of uracil-1-yl, 5-methyluracil-1-yl, 5-hydroxymethyluracil-1-yl, 5-fluorouracil-1-yl, cytosin-1-yl, 5-methylcytosin-1-yl, 5-hydroxymethylcytosin-1-yl, and 5-fluorocytosin-1-yl.

25. The compound of claim 23 wherein B is a purine base selected from the group consisting of adenin-9-yl, guanin-9-yl, 2-azaadenin-9-yl and 8-aza-9-deazaadenin-9-yl.

26. A process for preparing hexofuranosyluronamide pyrimidine nucleoside which comprises the steps of:
(a) treating a pyrimidine furanosyl nucleoside having the formula:

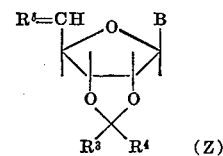
(Z)

wherein $R^5$ is oxo or $=(OH)_2$; $R^3$ and $R^4$ are independently lower alkyl or aryl having 6 through 10 carbon atoms, or $R^3$ and $R^4$ together with the carbon atom to which they are joined form a saturated cycloalkyl having 5 through 7 ring atoms and B is a pyrimidine base selected from the group having the formulas:

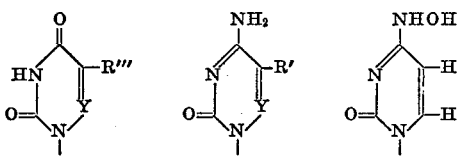

wherein
R' and R''' are hydrogen, fluoro, chloro, bromo, iodo, lower alkyl, trifluoromethyl, hydroxymethyl, nitro, methylamino, dimethylamino, and Y is a carbon atom or a nitrogen atom, and where Y is a nitrogen atom, then R' or R''' is hydrogen or methyl;
with a cyanide salt, in the presence of a base in an inert organic solvent under reactive conditions; and (b) treating the resulting reaction mixture of step (b) with hydrogen peroxide under reactive conditions thereby affording an epimeric mixture of β-D-allo and α-L-talo-hexofluranosyluronamide pyrmidine nucleosides corresponding to the pyrimidine furanosyl nucleoside used as a reactant in step (a).

27. The process of claim 26 wherein step (b) is effected about from 5 to 30 minutes after the initial contact of said cyanide salt with said pyrimidine furanosyl nucleoside.

28. The process of claim 26 wherein said cyanide salt is selected from the group consisting of sodium cyanide, potassium cyanide, ammonium cyanide, tetraethylammonium cyanide and mixtures thereof.

29. The process of claim 26 wherein said base is selected from the group of potassium carbonate and sodium carbonate.

30. The process of claim 26 wherein step (a) and step (b) are conducted at temperatures in the range of about from —10° to 20° C.

References Cited
UNITED STATES PATENTS

| | | | |
|---|---|---|---|
| 3,248,380 | 4/1966 | Moffatt et al. | 260—211.5 R |
| 3,575,959 | 4/1971 | Shen et al. | 260—211.5 R |

OTHER REFERENCES

Isono et al.: "Jour. Amer. Chem. Soc.," vol. 91, 1969, pp. 7490–7493.

JOHNNIE R. BROWN, Primary Examiner

U.S. Cl. X.R.

424—180